United States Patent
Sugiyama et al.

(10) Patent No.: US 12,476,435 B2
(45) Date of Patent: Nov. 18, 2025

(54) SEMICONDUCTOR LASER ELEMENT, SEMICONDUCTOR LASER DEVICE, AND METHOD FOR MANUFACTURING SEMICONDUCTOR LASER ELEMENT

(71) Applicant: HAMAMATSU PHOTONICS K.K., Hamamatsu (JP)

(72) Inventors: Atsushi Sugiyama, Hamamatsu (JP); Kousuke Shibata, Hamamatsu (JP)

(73) Assignee: HAMAMATSU PHOTONICS K.K., Shizuoka (JP)

( * ) Notice: Subject to any disclaimer, the term of this patent is extended or adjusted under 35 U.S.C. 154(b) by 642 days.

(21) Appl. No.: 17/960,281

(22) Filed: Oct. 5, 2022

(65) Prior Publication Data

US 2023/0114599 A1  Apr. 13, 2023

(30) Foreign Application Priority Data

Oct. 11, 2021 (JP) .................................. 2021-166956

(51) Int. Cl.
*H01S 5/042* (2006.01)
*H01S 5/02* (2006.01)
(Continued)

(52) U.S. Cl.
CPC ........ *H01S 5/04254* (2019.08); *H01S 5/0202* (2013.01); *H01S 5/04256* (2019.08); *H01S 5/2222* (2013.01); *H01S 5/227* (2013.01); *H01S 5/3402* (2013.01); *H01S 5/0234* (2021.01); *H01S 5/04252* (2019.08)

(58) Field of Classification Search
CPC . H01S 5/0202; H01S 5/04254; H01S 5/04256
See application file for complete search history.

(56) References Cited

U.S. PATENT DOCUMENTS 6,326,646 B1 * 12/2001 Baillargeon ........ H01S 5/02375
257/94
7,675,954 B2 * 3/2010 Kadowaki ........... H01S 5/04254
372/87
(Continued)

FOREIGN PATENT DOCUMENTS

CN 111106534 B * 11/2020 ............. H01S 5/005
JP H08-056017 A 2/1996
(Continued)

*Primary Examiner* — Tod T Van Roy
(74) *Attorney, Agent, or Firm* — Faegre Drinker Biddle & Reath LLP

(57) ABSTRACT

A semiconductor laser element includes: a semiconductor substrate; a semiconductor laminate; a first electrode in which a ridge portion of the semiconductor laminate is embedded; and a second electrode. A first region of a side surface of the first electrode is separated from a first end surface in such a manner to extend away from the first end surface as the first region extends away from the ridge portion to both sides. A shortest distance between a first side surface and the first region is smaller than each of a shortest distance between a third side surface and a third region and a shortest distance between a fourth side surface and a fourth region. The first region does not include a corner in a range satisfying $D_1 \leq S_1$ and $D_1 \leq S_2$.

10 Claims, 13 Drawing Sheets

(51) Int. Cl.
*H01S 5/22* (2006.01)
*H01S 5/227* (2006.01)
*H01S 5/34* (2006.01)
*H01S 5/0234* (2021.01)

(56) References Cited

U.S. PATENT DOCUMENTS

| | | | | |
|---|---|---|---|---|
| 8,155,162 | B2* | 4/2012 | Kohda | H01S 5/042 |
| | | | | 372/29.013 |
| 8,861,561 | B2* | 10/2014 | Kawakami | H01S 5/04252 |
| | | | | 372/43.01 |
| 8,896,002 | B2* | 11/2014 | Koda | H01S 5/16 |
| | | | | 257/E21.257 |
| 11,616,341 | B2* | 3/2023 | Cao | G02B 27/48 |
| | | | | 372/38.08 |
| 11,967,797 | B2* | 4/2024 | Ikeda | H01S 5/0202 |
| 2010/0085996 | A1* | 4/2010 | Matsuno | H01S 5/04256 |
| | | | | 438/42 |
| 2011/0281382 | A1* | 11/2011 | Bessho | H01S 5/04256 |
| | | | | 438/31 |
| 2015/0349490 | A1* | 12/2015 | Taguchi | H01S 5/22 |
| | | | | 372/38.05 |
| 2016/0056614 | A1* | 2/2016 | Okada | H01S 5/04256 |
| | | | | 372/45.01 |
| 2020/0067267 | A1* | 2/2020 | Takayama | H01S 5/0235 |
| 2023/0114599 | A1* | 4/2023 | Sugiyama | H01S 5/227 |
| | | | | 372/38.05 |
| 2023/0143711 | A1* | 5/2023 | Sugiyama | H01S 5/04252 |
| | | | | 372/45.012 |

FOREIGN PATENT DOCUMENTS

| | | |
|---|---|---|
| JP | 2004-039947 A | 2/2004 |
| JP | 2008-141039 A | 6/2008 |
| WO | WO-2018/083896 A1 | 5/2018 |
| WO | WO-2021/200582 A1 | 10/2021 |

* cited by examiner

SEMICONDUCTOR LASER ELEMENT, SEMICONDUCTOR LASER DEVICE, AND METHOD FOR MANUFACTURING SEMICONDUCTOR LASER ELEMENT

TECHNICAL FIELD

The present disclosure relates to a semiconductor laser element, a semiconductor laser device, and a method for manufacturing semiconductor laser element.

BACKGROUND

In the related art, a semiconductor laser element has been known which includes a semiconductor substrate having a first major surface and a second major surface facing each other; a semiconductor laminate including a ridge portion that forms a first end surface and a second end surface facing each other and that includes an active layer, and being formed on the first major surface of the semiconductor substrate; a first electrode formed on the semiconductor laminate in a state where the ridge portion is embedded in the first electrode; and a second electrode formed on the second major surface of the semiconductor substrate (for example, refer to International Publication No. WO 2018/083896). In such a semiconductor laser element, since the ridge portion is embedded in the first electrode, a sufficient heat dissipation characteristic can be secured. Moreover, a step of manufacturing the semiconductor laser element can be simplified as compared to when an embedding growth layer is formed on both sides of the ridge portion.

SUMMARY

In the above-described semiconductor laser element, in order to secure a good heat dissipation characteristic on each of the first end surface and the second end surface that may generate the most heat, it is preferable that the first electrode reaches the vicinity of each of the first end surface and the second end surface. However, when the first electrode that is thick enough to embed the ridge portion reaches the vicinity of each of the first end surface and the second end surface, during manufacturing of the semiconductor laser element, a cleavage defect may occur and the quality of each of the first end surface and the second end surface may decrease.

An object of the present disclosure is to provide a semiconductor laser element, a semiconductor laser device, and a method for manufacturing the semiconductor laser element capable of securing a good heat dissipation characteristic at least on a first end surface while suppressing a decrease in the quality of at least the first end surface.

A semiconductor laser element according to one aspect of the present disclosure includes: a semiconductor substrate having a first major surface and a second major surface facing each other in a first direction, a first side surface and a second side surface facing each other in a second direction perpendicular to the first direction, and a third side surface and a fourth side surface facing each other in a third direction perpendicular to both the first direction and the second direction; a semiconductor laminate including a ridge portion forming a first end surface and a second end surface facing each other in the second direction, including an active layer, and formed on the first major surface; a first electrode formed on the semiconductor laminate in a state where the ridge portion is embedded in the first electrode; and a second electrode formed on the second major surface. A side surface of the first electrode includes a first region on the first side surface side, a second region on the second side surface side, a third region on the third side surface side, and a fourth region on the fourth side surface side. The first region is located inside the first side surface when viewed in the first direction, the second region is located inside the second side surface when viewed in the first direction, the third region is located inside the third side surface when viewed in the first direction, and the fourth region is located inside the fourth side surface when viewed in the first direction. When viewed in the first direction, the first region is separated from the first end surface in such a manner to extend away from the first end surface in the second direction as the first region extends away from the ridge portion to both sides in the third direction. A shortest distance between the first side surface and the first region in the second direction is smaller than each of a shortest distance between the third side surface and the third region in the third direction and a shortest distance between the fourth side surface and the fourth region in the third direction. When a distance between the first side surface and the first region in the second direction is $D_1$, the shortest distance between the third side surface and the third region in the third direction is $S_1$, and the shortest distance between the fourth side surface and the fourth region in the third direction is $S_2$, the first region does not include a corner in a range satisfying $D_1 \leq S_1$ and $D_1 \leq S_2$ when viewed in the first direction.

A semiconductor laser device according to one aspect of the present disclosure includes: the semiconductor laser element; and a drive unit configured to drive the semiconductor laser element.

A method for manufacturing the semiconductor laser element according to one aspect of the present disclosure includes: a first step of preparing a semiconductor wafer including a plurality of substrate portions each of which becomes the semiconductor substrate, and of forming a semiconductor layer including a plurality of laminate portions each of which becomes the semiconductor laminate on one major surface of the semiconductor wafer; a second step of forming a first electrode layer including a plurality of first electrode portions each of which becomes the first electrode on the semiconductor layer; a third step of forming a second electrode layer including a plurality of second electrode portions each of which becomes the second electrode on the other major surface of the semiconductor wafer; and a fourth step of cleaving the semiconductor wafer and the semiconductor layer along each of a plurality of lines partitioning a plurality of element portions each of which becomes the semiconductor laser element off from each other. In the first step, the semiconductor layer is formed on the one major surface of the semiconductor wafer such that the plurality of laminate portions are arranged in a matrix pattern. In the second step, the first electrode layer is formed on the semiconductor layer such that the plurality of first electrode portions correspond to the plurality of laminate portions. In the third step, the second electrode layer is formed on the other major surface of the semiconductor wafer such that the plurality of second electrode portions correspond to the plurality of laminate portions. In the fourth step, the semiconductor wafer and the semiconductor layer are cleaved along each of a plurality of first lines extending in the third direction among the plurality of lines, and thereafter, the semiconductor wafer and the semiconductor layer are cleaved along each of a plurality of second lines extending in the second direction among the plurality of lines.

DETAILED DESCRIPTION

Figure 1:
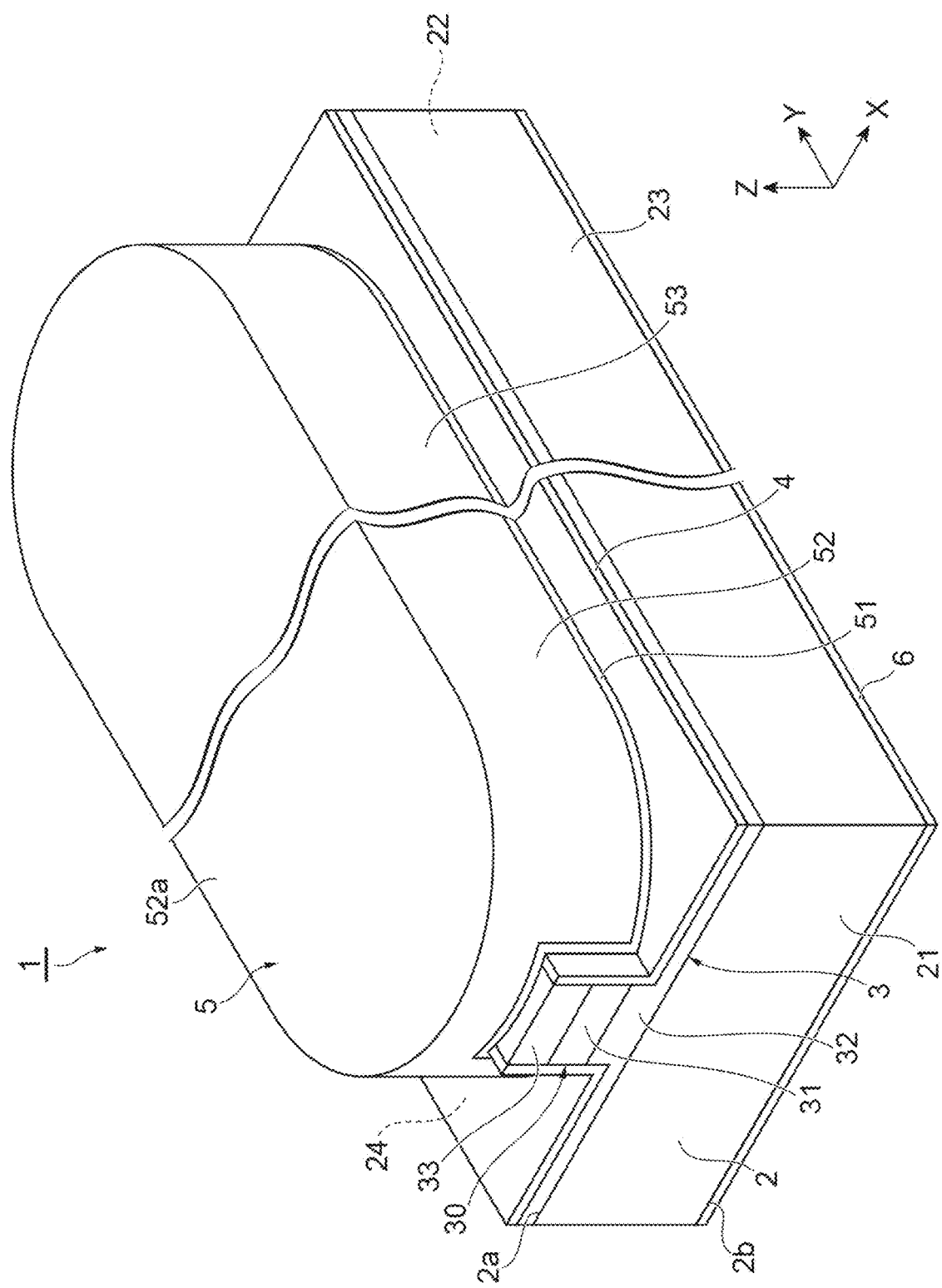
FIG. 1 is a perspective view of a semiconductor laser element of one embodiment.

Hereinafter, an embodiment of the present disclosure will be described in detail with reference to the drawings. Incidentally, in the drawings, the same or equivalent portions are denoted by the same reference signs, and a duplicated description will be omitted.

[Configuration of Semiconductor Laser Element]

Figure 2:
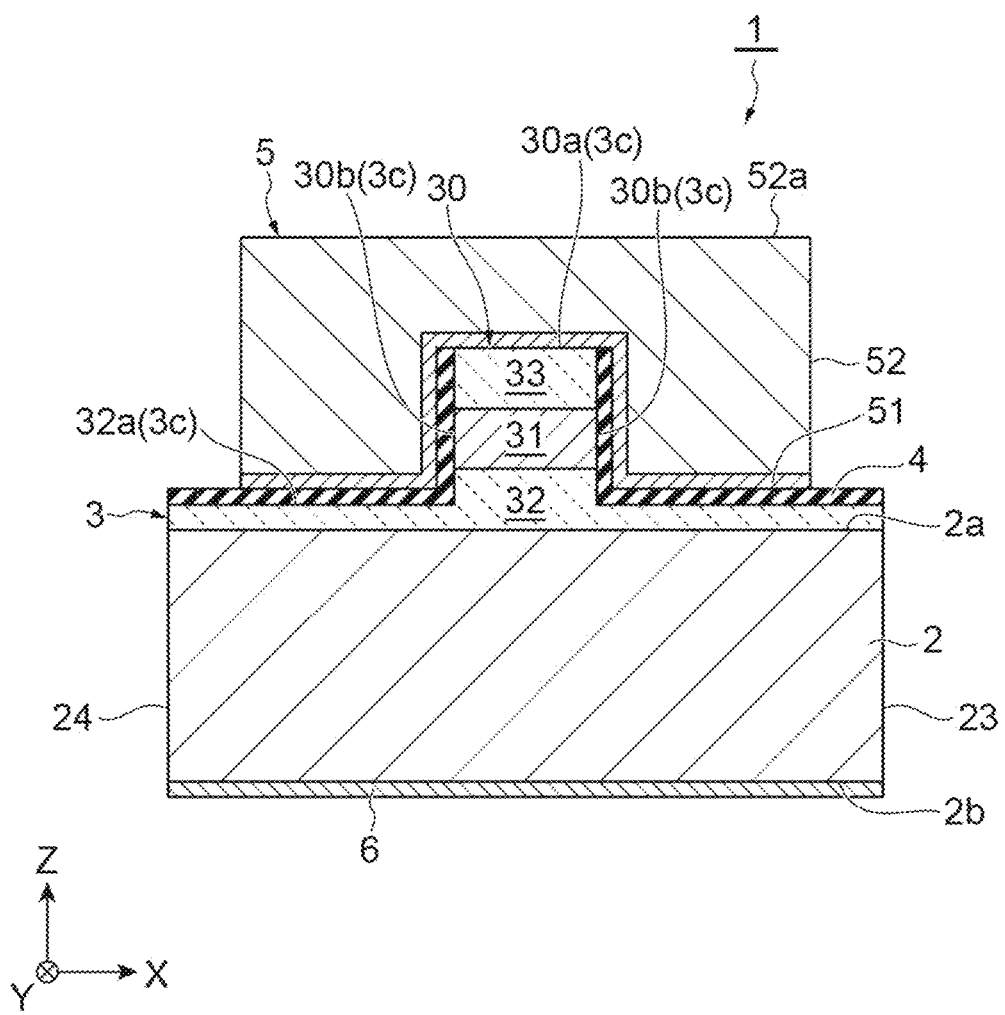
FIG. 2 is a cross-sectional view of the semiconductor laser element shown in FIG. 1.
Figure 3:
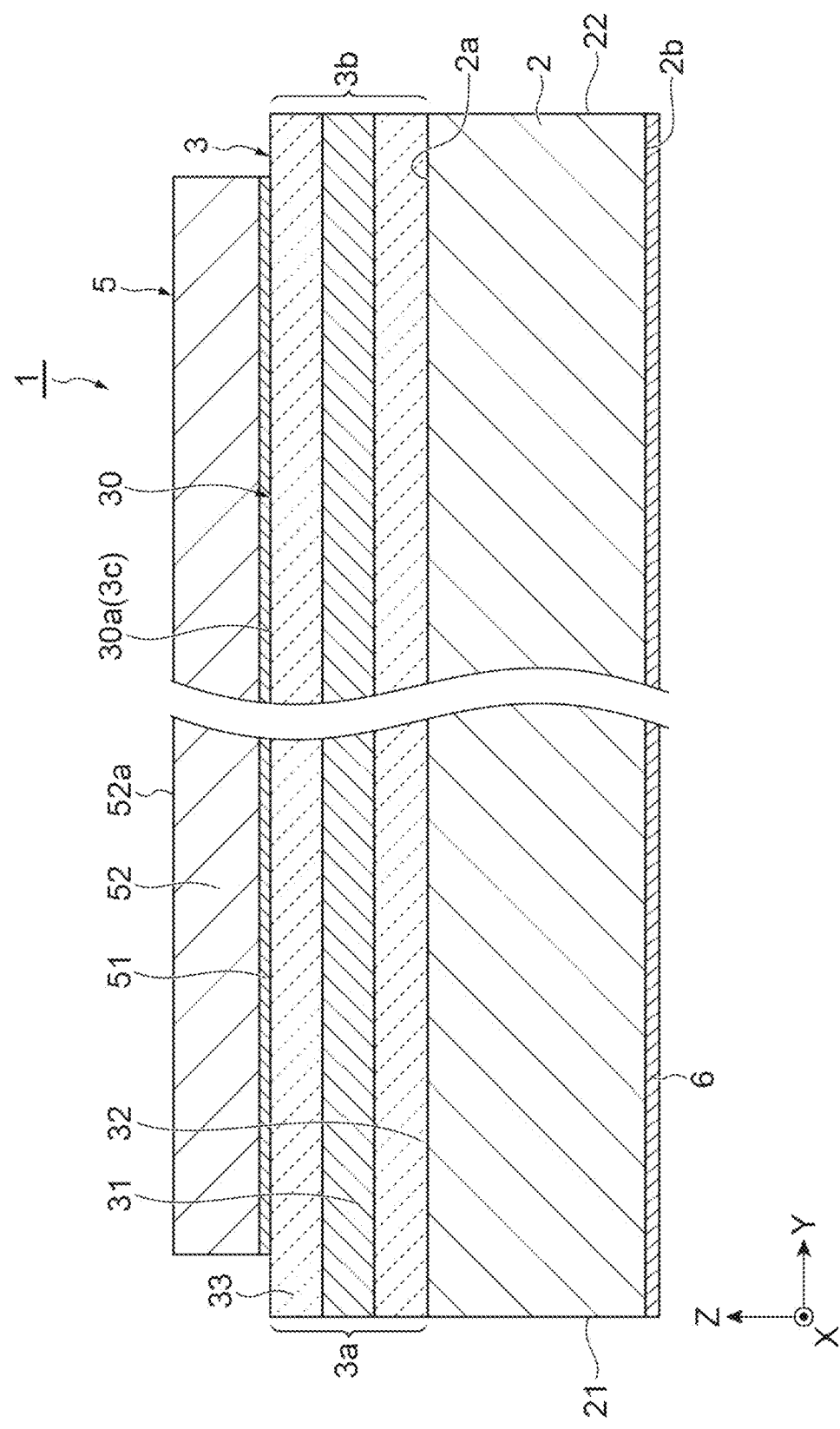
FIG. 3 is a cross-sectional view of the semiconductor laser element shown in FIG. 1.

As shown in FIGS. 1 to 3, a semiconductor laser element 1 includes a semiconductor substrate 2, a semiconductor laminate 3, an insulating film 4, a first electrode 5, and a second electrode 6. The semiconductor substrate 2 has a first major surface 2a, a second major surface 2b, a first side surface 21, a second side surface 22, a third side surface 23, and a fourth side surface 24. The first major surface 2a and the second major surface 2b face each other in a Z-axis direction (first direction). The first side surface 21 and the second side surface 22 face each other in a Y-axis direction (second direction perpendicular to the first direction). The third side surface 23 and the fourth side surface 24 face each other in an X-axis direction (third direction perpendicular to the first direction and to the second direction). The semiconductor substrate 2 has a plate shape in which the Z-axis direction is a thickness direction, the X-axis direction is a width direction, and the Y-axis direction is a length direction. The semiconductor substrate 2 is, for example, an N-type InP single crystal substrate having a rectangular plate shape. As one example, a length of the semiconductor substrate 2 is approximately 4 mm, a width of the semiconductor substrate 2 is approximately 500 µm, and a thickness of the semiconductor substrate 2 is approximately 150 µm.

The semiconductor laminate 3 is formed on the first major surface 2a of the semiconductor substrate 2. The semiconductor laminate 3 includes an active layer 31 having a quantum cascade structure. The semiconductor laminate 3 is configured to oscillate laser light having a predetermined center wavelength (for example, a center wavelength of any value of 4 to 11 µm that is a wavelength in a mid-infrared region). In the present embodiment, the semiconductor laminate 3 is formed by stacking a lower cladding layer 32, a lower guide layer (not shown), the active layer 31, an upper guide layer (not shown), an upper cladding layer 33, and a contact layer (not shown) in order from a semiconductor substrate 2 side. The upper guide layer may have a diffraction grating structure functioning as a distributed feedback (DFB) structure.

The active layer 31 is, for example, a layer having a multiple quantum well structure of InGaAs/InAlAs. Each of the lower cladding layer 32 and the upper cladding layer 33 is, for example, a Si-doped InP layer. Each of the lower guide layer and the upper guide layer is, for example, a Si-doped InGaAs layer. The contact layer is, for example, a Si-doped InGaAs layer.

The semiconductor laminate 3 includes a ridge portion 30 extending along the Y-axis direction. The ridge portion 30 is formed of a portion on an opposite side of the lower cladding layer 32 from the semiconductor substrate 2, the lower guide layer, the active layer 31, the upper guide layer, the upper cladding layer 33, and the contact layer. Namely, the ridge portion 30 includes the active layer 31. A width of the ridge portion 30 in the X-axis direction is smaller than a width of the semiconductor substrate 2 in the X-axis direction. A length of the ridge portion 30 in the Y-axis direction is equal to a length of the semiconductor substrate 2 in the Y-axis direction. As one example, the length of the ridge portion 30 is approximately 4 mm, the width of the ridge portion 30 is approximately 10 µm to 50 µm, and a height of the ridge portion 30 is approximately 5 µm to 20 µm. The ridge portion 30 is located at the center of the semiconductor substrate 2 in the X-axis direction. Each layer forming the semiconductor laminate 3 does not exist on both sides of the ridge portion 30 in the X-axis direction.

The semiconductor laminate 3 has a first end surface 3a and a second end surface 3b facing each other in the Y-axis direction. Namely, the ridge portion 30 forms the first end surface 3a and the second end surface 3b facing each other in the Y-axis direction. The Y-axis direction is an extending direction of the ridge portion 30 and is a light waveguide direction of the ridge portion 30. The first end surface 3a and the second end surface 3b function as light-emitting end surfaces. The first end surface 3a is located on the same plane as that of the first side surface 21 of the semiconductor substrate 2. The second end surface 3b is located on the same plane as that of the second side surface 22 of the semiconductor substrate 2. Both side surfaces of the semiconductor laminate 3 facing each other in the X-axis direction are located on the same planes as those of the third side surface 23 and the fourth side surface 24 of the semiconductor substrate 2.

The insulating film 4 is formed on side surfaces 30b of the ridge portion 30 and on a surface 32a of the lower cladding layer 32 such that a surface 30a on an opposite side of the ridge portion 30 from the semiconductor substrate 2 is exposed. The side surfaces 30b of the ridge portion 30 are both side surfaces of the ridge portion 30 facing each other in the X-axis direction. The surface 32a of the lower cladding layer 32 is a surface of a portion on an opposite side of the lower cladding layer 32 from the semiconductor substrate 2, the portion not forming the ridge portion 30. The insulating film 4 is, for example, a SiN film or a SiO$_2$ film.

The first electrode 5 is formed on a surface 3c on an opposite side of the semiconductor laminate 3 from the semiconductor substrate 2. The surface 3c of the semiconductor laminate 3 is a surface formed of the surface 30a of the ridge portion 30, the side surfaces 30b of the ridge portion 30, and the surface 32a of the lower cladding layer 32. When viewed in the Z-axis direction, an outer edge of the first electrode 5 is located inside outer edges of the semiconductor substrate 2 and the semiconductor laminate 3. The first electrode 5 is in contact with the surface 30a of the ridge portion 30 on the surface 30a of the ridge portion 30 and is in contact with the insulating film 4 on the side surfaces 30b of the ridge portion 30 and on the surface 32a of the lower cladding layer 32. Accordingly, the first electrode 5 is electrically connected to the upper cladding layer 33 through the contact layer.

The first electrode 5 includes a metal foundation layer 51 and a metal plating layer 52. The metal foundation layer 51 is formed to extend along the surface 3c of the semiconductor laminate 3. Namely, the metal foundation layer 51 is formed on the semiconductor laminate 3. The metal foundation layer 51 is, for example, a Ti/Au layer. The metal plating layer 52 is formed on the metal foundation layer 51 such that the ridge portion 30 is embedded in the metal plating layer 52. Namely, the first electrode 5 is formed on the semiconductor laminate 3 in a state where the ridge portion 30 is embedded in the first electrode 5. The metal plating layer 52 is, for example, an Au plating layer. A surface 52a on an opposite side of the metal plating layer 52 from the semiconductor substrate 2 is a flat surface perpendicular to the Z-axis direction. As one example, the surface 52a of the metal plating layer 52 is a polished surface that is flattened by chemical mechanical polishing, and polishing marks are formed on surface 52a of the metal plating layer 52. Incidentally, the state where the ridge portion 30 is embedded in the first electrode 5 is a state where the ridge portion 30 is covered with the first electrode 5 in a state where a thickness of portions of the first electrode 5 (thickness of the portions in the Z-axis direction) is larger than the height of the ridge portion 30 (thickness of the ridge portion 30 in the Z-axis direction), the portions being located on both sides of the ridge portion 30 in the X-axis direction.

The second electrode 6 is formed on the second major surface 2b of the semiconductor substrate 2. The second electrode 6 is, for example, an AuGe/Au film, an AuGe/Ni/Au film, or an Au film. The second electrode 6 is electrically connected to the lower cladding layer 32 through the semiconductor substrate 2.

In the semiconductor laser element 1 configured as described above, when a bias voltage is applied to the active layer 31 through the first electrode 5 and through the second electrode 6, light is emitted from the active layer 31, and light having a predetermined center wavelength of the light is oscillated in the distributed feedback structure. Accordingly, the laser light having the predetermined center wavelength is emitted from each of the first end surface 3a and the second end surface 3b. Incidentally, when a low reflection film is formed on one end surface of the first end surface 3a and the second end surface 3b, the laser light having the predetermined center wavelength is also emitted from the other end surface of the first end surface 3a and the second end surface 3b, but the laser light having the predetermined center wavelength is emitted with high output from the one end surface on which the low reflection film is formed. In addition, a high reflection film may be formed on one end surface of the first end surface 3a and the second end surface. In that case, the laser light having the predetermined center wavelength is emitted from the other end surface of the first end surface 3a and the second end surface 3b.

[Configuration of First Electrode]

As shown in FIG. 1, the first electrode 5 has a side surface 53. The side surface 53 intersects each of the first major surface 2a of the semiconductor substrate 2 and the surface 52a of the metal plating layer 52. In the present embodiment, the side surface 53 is formed by the metal foundation layer 51 and the metal plating layer 52. A width of the side surface 53 in the Z-axis direction is 50% or more of the height of the ridge portion 30 in the Z-axis direction. Incidentally, a thickness of the metal foundation layer 51 is approximately several hundreds of nm, a thickness of the metal plating layer 52 is 5 μm or more, and the height of the ridge portion 30 is 5 μm or more.

Figure 4:
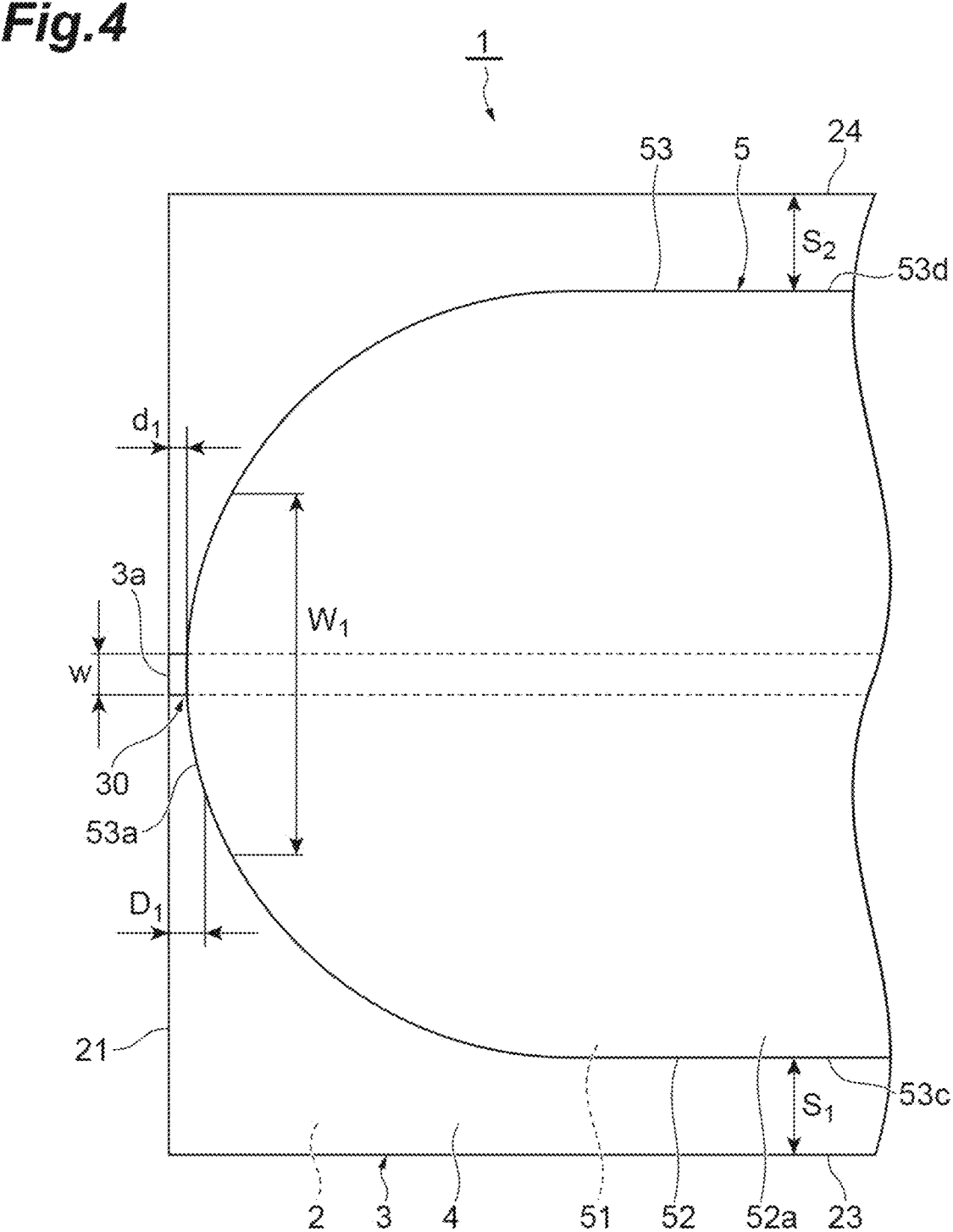
FIG. 4 is a partial plan view of the semiconductor laser element shown in FIG. 1.
Figure 5:
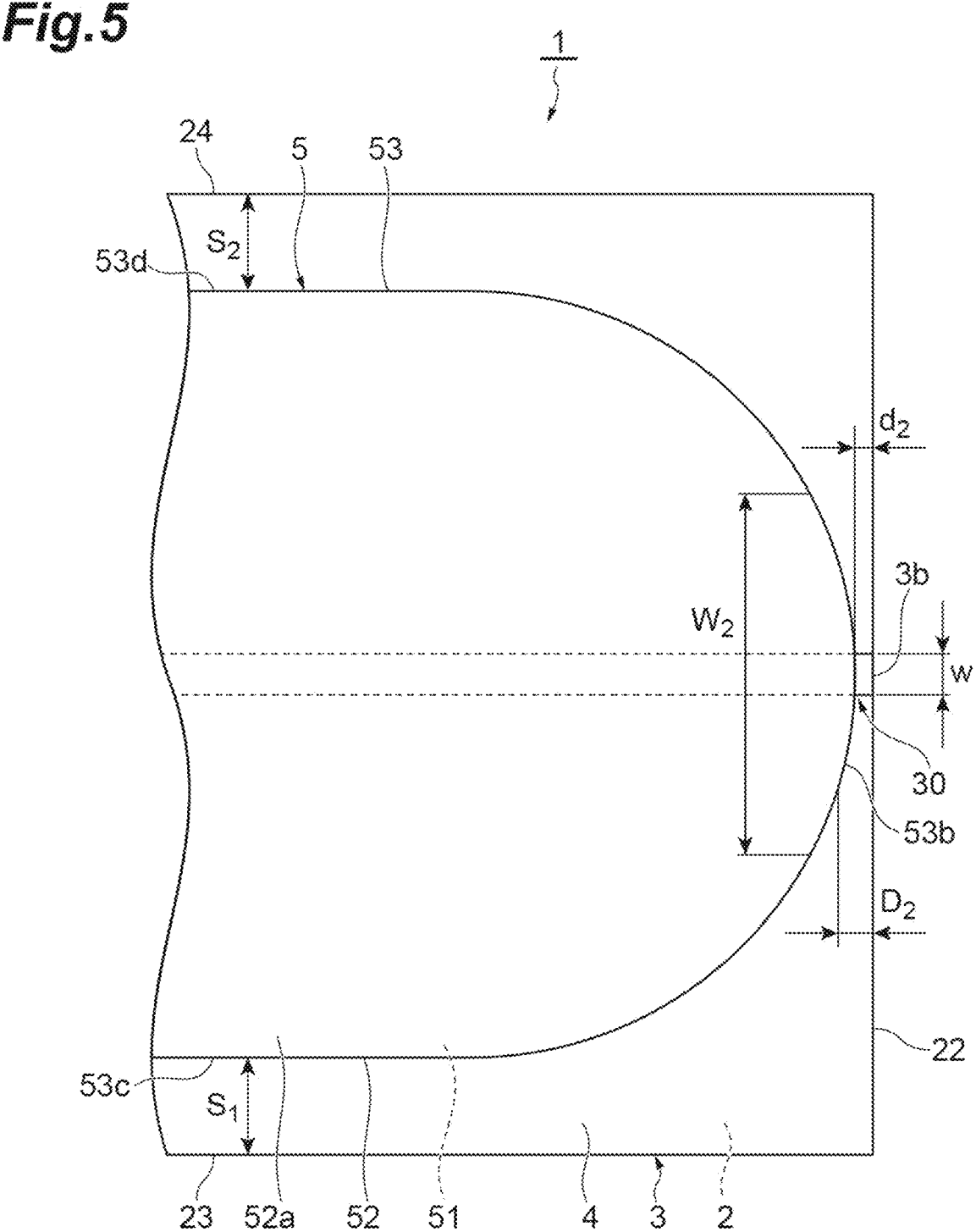
FIG. 5 is a partial plan view of the semiconductor laser element shown in FIG. 1.
Figure 5:
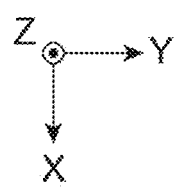

As shown in FIGS. 4 and 5, the side surface 53 of the first electrode 5 includes a first region 53a on a first side surface 21 side, a second region 53b on a second side surface 22 side, a third region 53c on a third side surface 23 side, and a fourth region 53d on a fourth side surface 24 side. The first region 53a is located inside the first side surface 21 when viewed in the Z-axis direction. The second region 53b is located inside the second side surface 22 when viewed in the Z-axis direction. The third region 53c is located inside the third side surface 23 when viewed in the Z-axis direction. The fourth region 53d is located inside the fourth side surface 24 when viewed in the Z-axis direction. In the present embodiment, each of the third region 53c and the fourth region 53d extends linearly along the Y-axis direction when viewed in the Z-axis direction.

As shown in FIG. 4, when viewed in the Z-axis direction, the first region 53a is separated from the first end surface 3a in such a manner to extend away from the first end surface 3a in the Y-axis direction as the first region 53a extends away from the ridge portion 30 to both sides in the X-axis direction. A shortest distance between the first end surface 3a and the first region 53a in the Y-axis direction is 50 μm or less. Since the first end surface 3a is located on the same plane as that of the first side surface 21 of the semiconductor substrate 2, a shortest distance between the first side surface 21 and the first region 53a in the Y-axis direction is also 50 μm or less.

The shortest distance between the first side surface 21 and the first region 53a in the Y-axis direction is smaller than each of a shortest distance between the third side surface 23 and the third region 53c in the X-axis direction and a shortest distance between the fourth side surface 24 and the fourth region 53d in the X-axis direction. In the present embodiment, the shortest distance between the third side surface 23 and the third region 53c in the X-axis direction and the shortest distance between the fourth side surface 24 and the fourth region 53d in the X-axis direction are equal to each other.

When a distance between the first side surface 21 and the first region 53a in the Y-axis direction is $D_1$, the shortest distance between the third side surface 23 and the third region 53c in the X-axis direction is $S_1$, and the shortest distance between the fourth side surface 24 and the fourth region 53d in the X-axis direction is $S_2$, the first region 53a does not include a corner in a range satisfying $D_1 \leq S_1$ and $D_1 \leq S_2$ when viewed in the Z-axis direction. When the width of the ridge portion 30 in the X-axis direction is w and a width of the first region 53a in the X-axis direction is $W_1$, the first region 53a does not include a corner in a range satisfying $W_1 \leq 10w$ when viewed in the Z-axis direction. The fact that the first region 53a does not include a corner in a predetermined range when viewed in the Z-axis direction means that regarding "an intersection line between a plane perpendicular to the Z-axis direction and the first region 53a" in the predetermined range, when the intersection line is formed of a curved line, the slope of a tangential line of the curved line changes continuously, and means that when the intersection line is formed of a straight line and a curved line, the slope of the straight line and the slope of a tangential line of the curved line change continuously. Namely, both in the range satisfying $D_1 \leq S_1$ and $D_1 \leq S_2$ and in the range satisfying $W_1 \leq 10$ w, the intersection line between the plane perpendicular to the Z-axis direction and the first region 53a extends smoothly. As one example, when viewed in the Z-axis direction, the first region 53a extends in an arc (semicircle having a radius of approximately 200 μm) shape protruding to a first end surface 3a side, and is smoothly connected to each of the third region 53c and the fourth region 53d. In this case, a distance between the third region 53c and the fourth region 53d is approximately 400 μm.

In the present embodiment, when the shortest distance between the first side surface 21 and the first region 53a in the Y-axis direction is $d_1$, the semiconductor laser element 1 satisfies $D_1 - d_1 \leq 500/d_1$. The semiconductor laser element 1 satisfies $d_1 \leq w$. The semiconductor laser element 1 satisfies $d_1 \leq$ "the thickness of the metal plating layer 52". When viewed in the Z-axis direction, the first region 53a and the third region 53c are smoothly connected to each other without including a corner. When viewed in the Z-axis direction, the first region 53a and the fourth region 53d are smoothly connected to each other without including a corner. Regarding a region including the first region 53a and connecting the third region 53c and the fourth region 53d, a value of ½ of a width of the region in the X-axis direction is larger than a width of the region in the Y-axis direction.

As shown in FIG. 5, when viewed in the Z-axis direction, the second region 53b is separated from the second end surface 3b in such a manner to extend away from the second end surface 3b in the Y-axis direction as the second region 53b extends away from the ridge portion 30 to both sides in the X-axis direction. A shortest distance between the second end surface 3b and the second region 53b in the Y-axis direction is 50 μm or less. Since the second end surface 3b is located on the same plane as that of the second side surface 22 of the semiconductor substrate 2, a shortest distance between the second side surface 22 and the second region 53b in the Y-axis direction is also 50 μm or less.

The shortest distance between the second side surface 22 and the second region 53b in the Y-axis direction is smaller than each of the shortest distance between the third side surface 23 and the third region 53c in the X-axis direction and the shortest distance between the fourth side surface 24 and the fourth region 53d in the X-axis direction. In the present embodiment, the shortest distance between the third side surface 23 and the third region 53c in the X-axis direction and the shortest distance between the fourth side surface 24 and the fourth region 53d in the X-axis direction are equal to each other.

When a distance between the second side surface 22 and the second region 53b in the Y-axis direction is $D_2$, the shortest distance between the third side surface 23 and the third region 53c in the X-axis direction is $S_1$, and the shortest distance between the fourth side surface 24 and the fourth region 53d in the X-axis direction is $S_2$, the second region 53b does not include a corner in a range satisfying $D_2 \leq S_1$ and $D_2 \leq S_2$ when viewed in the Z-axis direction. When the width of the ridge portion 30 in the X-axis direction is w and a width of the second region 53b in the X-axis direction is $W_2$, the second region 53b does not include a corner in a range satisfying $W_2 \leq 10$ w when viewed in the Z-axis direction. The fact that the second region 53b does not include a corner in a predetermined range when viewed in the Z-axis direction means that regarding "an intersection line between a plane perpendicular to the Z-axis direction and the second region 53b" in the predetermined range, when the intersection line is formed of a curved line, the slope of a tangential line of the curved line changes continuously, and means that when the intersection line is formed of a straight line and a curved line, the slope of the straight line and the slope of a tangential line of the curved line change continuously. Namely, both in the range satisfying $D_2 \leq S_1$ and $D_2 \leq S_2$ and in the range satisfying $W_2 \leq 10$ w, the intersection line between the plane perpendicular to the Z-axis direction and the second region 53b extends smoothly. As one example, when viewed in the Z-axis direction, the second region 53b extends in an arc (semicircle having a radius of approximately 200 μm) shape protruding to a second end surface 3b side, and is smoothly connected to each of the third region 53c and the fourth region 53d.

In the present embodiment, when the shortest distance between the second side surface 22 and the second region 53b in the Y-axis direction is $d_2$, the semiconductor laser element 1 satisfies $D_2 - d_2 \leq 500/d_2$. The semiconductor laser element 1 satisfies $d_2 \leq w$. The semiconductor laser element 1 satisfies $d_2 \leq$ "the thickness of the metal plating layer 52". When viewed in the Z-axis direction, the second region 53b and the third region 53c are smoothly connected to each other without including a corner. When viewed in the Z-axis direction, the second region 53b and the fourth region 53d are smoothly connected to each other without including a corner. Regarding a region including the second region 53b and connecting the third region 53c and the fourth region 53d, a value of ½ of a width of the region in the X-axis direction is larger than a width of the region in the Y-axis direction.

[Configuration of Semiconductor Laser Element]

Figure 6:
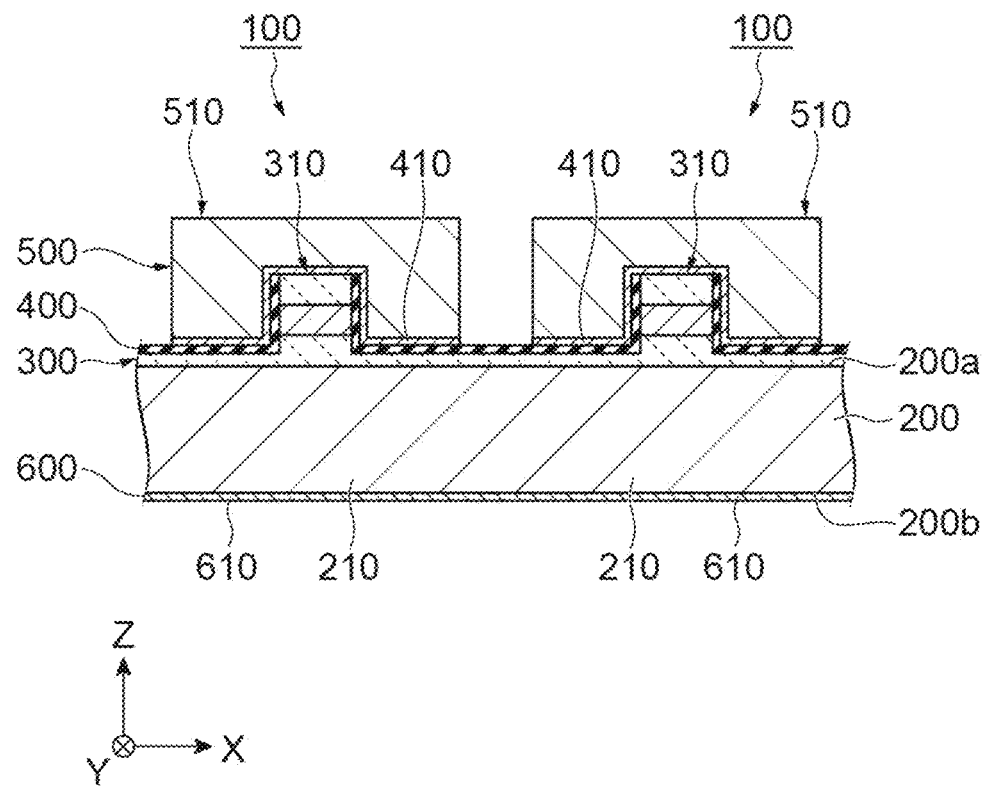
FIG. 6 is a view showing a method for manufacturing the semiconductor laser element shown in FIG. 1.

As shown in FIG. 6, a semiconductor wafer 200 including a plurality of substrate portions 210 is prepared, and a semiconductor layer 300 including a plurality of laminate portions 310 is formed on one major surface 200a of the semiconductor wafer 200 (first step). Each of the plurality of substrate portions 210 is a portion that becomes the semiconductor substrate 2. Each of the plurality of laminate portions 310 is a portion that becomes the semiconductor laminate 3. In the first step, the semiconductor layer 300 is formed on the one major surface 200a of the semiconductor wafer 200 such that the plurality of laminate portions 310 are arranged in a matrix pattern. In the first step, for example, epitaxial growth for forming the plurality of laminate portions 310, dry etching for forming a plurality of the ridge portions 30, and the like are performed.

Subsequently, an insulating layer 400 including a plurality of film portions 410 is formed on the semiconductor layer 300 such that the surface 30a (refer to FIG. 2) of each of the ridge portions 30 is exposed. Each of the plurality of film portions 410 is a portion that becomes the insulating film 4. Subsequently, a first electrode layer 500 including a plurality of first electrode portions 510 is formed on the semiconductor layer 300 (second step). Each of the plurality of first electrode portions 510 is a portion that becomes the first electrode 5. In the second step, the first electrode layer 500 is formed on the semiconductor layer 300 such that the plurality of first electrode portions 510 correspond to the plurality of laminate portions 310. In the second step, for example, the sputtering of Ti and Au for forming a plurality of the metal foundation layers 51, the plating of Au for forming a plurality of the metal plating layers 52, chemical mechanical polishing for collectively forming a plurality of the surfaces 52a of the plurality of metal plating layers 52, and the like are performed.

Subsequently, a second electrode layer 600 including a plurality of second electrode portions 610 is formed on the other major surface 200b of the semiconductor wafer 200 (third step). Each of the plurality of second electrode portions 610 is a portion that becomes the second electrode 6. In the third step, the second electrode layer 600 is formed on the other major surface 200b of the semiconductor wafer 200 such that the plurality of second electrode portions 610 correspond to the plurality of laminate portions 310. In the third step, for example, the polishing of the other major surface 200b for thinning the semiconductor wafer 200, an alloy heat treatment of the second electrode layer 600, and the like are performed. Accordingly, a plurality of element portions 100 that are integrated in a state where the element portions 100 are arranged in a matrix pattern are obtained. Each of the plurality of element portions 100 is a portion that becomes the semiconductor laser element 1. Incidentally, the third step is not limited to being performed after the second step and may be performed at another timing (for example, between the formation of the insulating layer 400 and the second step or in the middle of the second step).

Figure 7A:
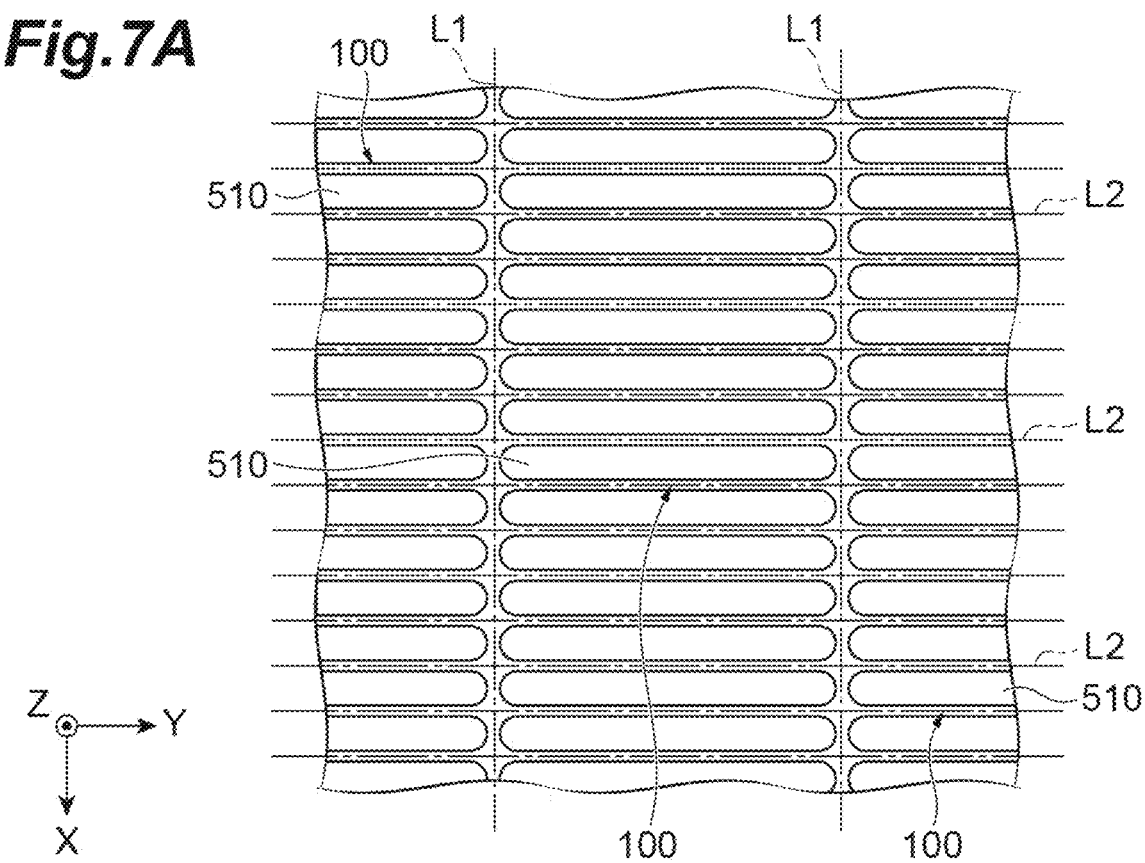
FIGS. 7A and 7B are views showing the method for manufacturing the semiconductor laser element shown in FIG. 1.
Figure 7B:
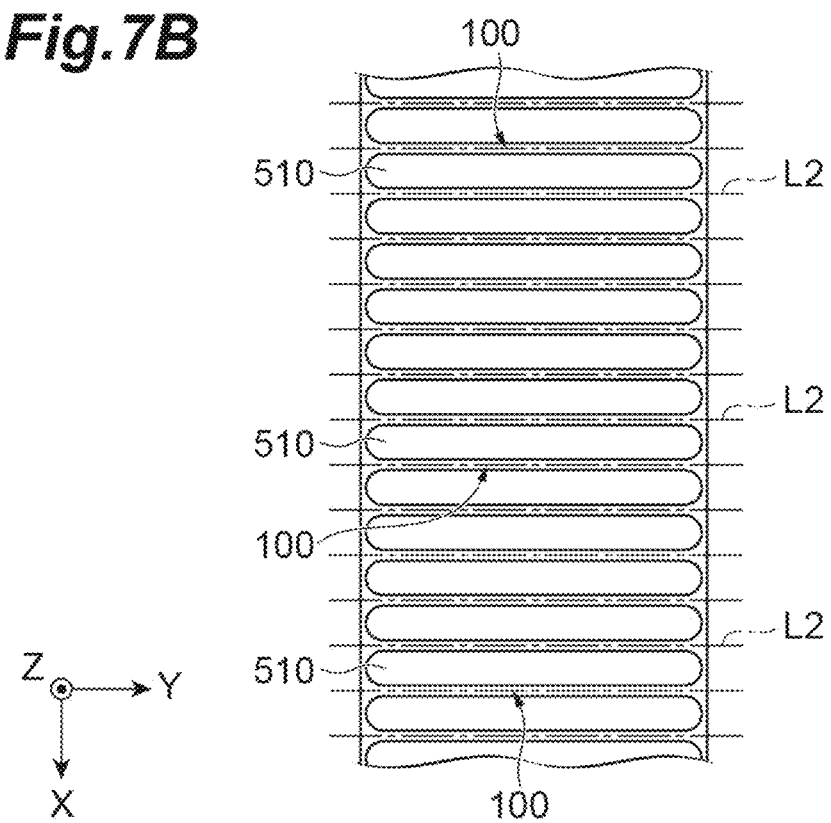

Subsequently, the semiconductor wafer 200 and the semiconductor layer 300 are cleaved along each of a plurality of lines partitioning the plurality of element portions 100 off from each other (fourth step). Specifically, as shown in FIG. 7A, the semiconductor wafer 200 and the semiconductor layer 300 are cleaved along each of a plurality of first lines L1 extending in the X-axis direction among the plurality of lines (primary cleavage). Accordingly, as shown in FIG. 7B, a plurality of the element portions 100 that are integrated in a state where the element portions 100 are one-dimensionally arranged in the X-axis direction are obtained. After the primary cleavage, the semiconductor wafer 200 and the semiconductor layer 300 are cleaved along each of a plurality of second lines L2 extending in the Y-axis direction among the plurality of lines (secondary cleavage). Accordingly, a plurality of the semiconductor laser elements 1 are obtained.

Figure 8A:
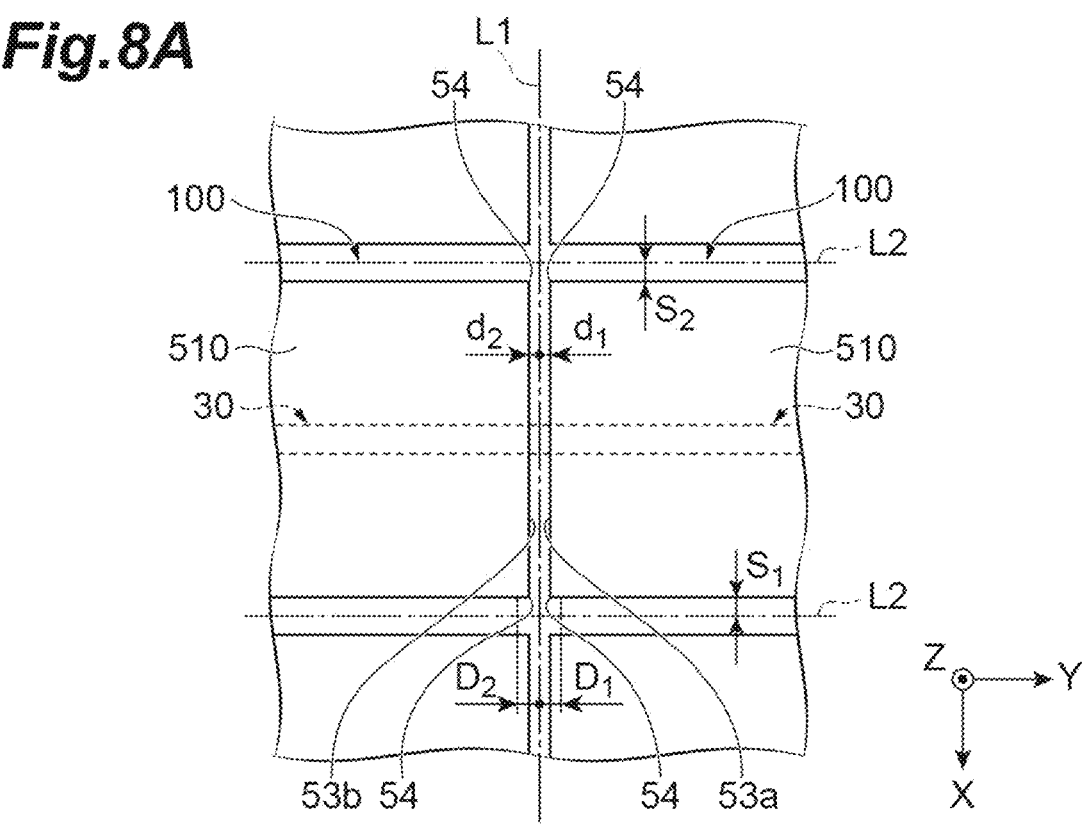
FIGS. 8A and 8B are plan views of a plurality of element portions that are integrated in a state where the element portions are arranged in a matrix pattern.

Here, a cleavage defect occurring during manufacturing of the semiconductor laser elements 1 will be described. In a comparative example shown in FIG. 8A, in each of the plurality of element portions 100 that are integrated in a state where the element portions 100 are arranged in a matrix pattern, the first electrode portions 510 have a rectangular shape when viewed in the Z-axis direction. In this case, regarding a pair of the element portions 100 adjacent to each other with the first line L1 interposed therebetween, in one element portion 100, a pair of corners 54 exist in the range satisfying $D_1 \leq S_1$ and $D_1 \leq S_2$, and in the other element portion 100, a pair of corners 54 exist in the range satisfying $D_2 \leq S_1$ and $D_2 \leq S_2$. For this reason, the pair of corners 54 included in the one element portion 100 and the pair of corners 54 included in the other element portion 100 face each other in proximity to each other.

Figure 9A:
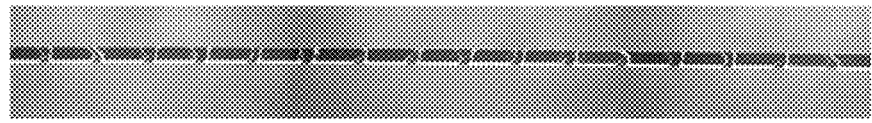
FIGS. 9A and 9B are views showing pictures of cleavage surfaces of the plurality of element portions that are integrated in a state where the element portions are one-dimensionally arranged.

In this state, when the semiconductor wafer 200 and the semiconductor layer 300 are cleaved along each of the plurality of first lines L1 (primary cleavage), as shown in FIG. 9A, a plurality of streaks are likely to appear on cleavage surfaces of a plurality of the element portions 100 that are integrated in a state where the element portions 100 are one-dimensionally arranged. A picture shown in FIG. 9A is a picture obtained when the width of the side surface 53 in the Z-axis direction (refer to FIG. 1) is approximately 9 µm and a street width (namely, $d_1+d_2$) is approximately 10 µm. It is considered that the reason that the plurality of such streaks appear is that stress is concentrated on a portion corresponding to each of the pair of corners 54 during the primary cleavage. In a state where the plurality of such streaks have appeared, when the semiconductor wafer 200 and the semiconductor layer 300 are cleaved along each of the plurality of second lines L2 (secondary cleavage), a pair of streaks remain on each of the first end surface 3a and the second end surface 3b of the obtained semiconductor laser element 1, and the quality of each of the first end surface 3a and the second end surface 3b decreases.

Figure 8B:
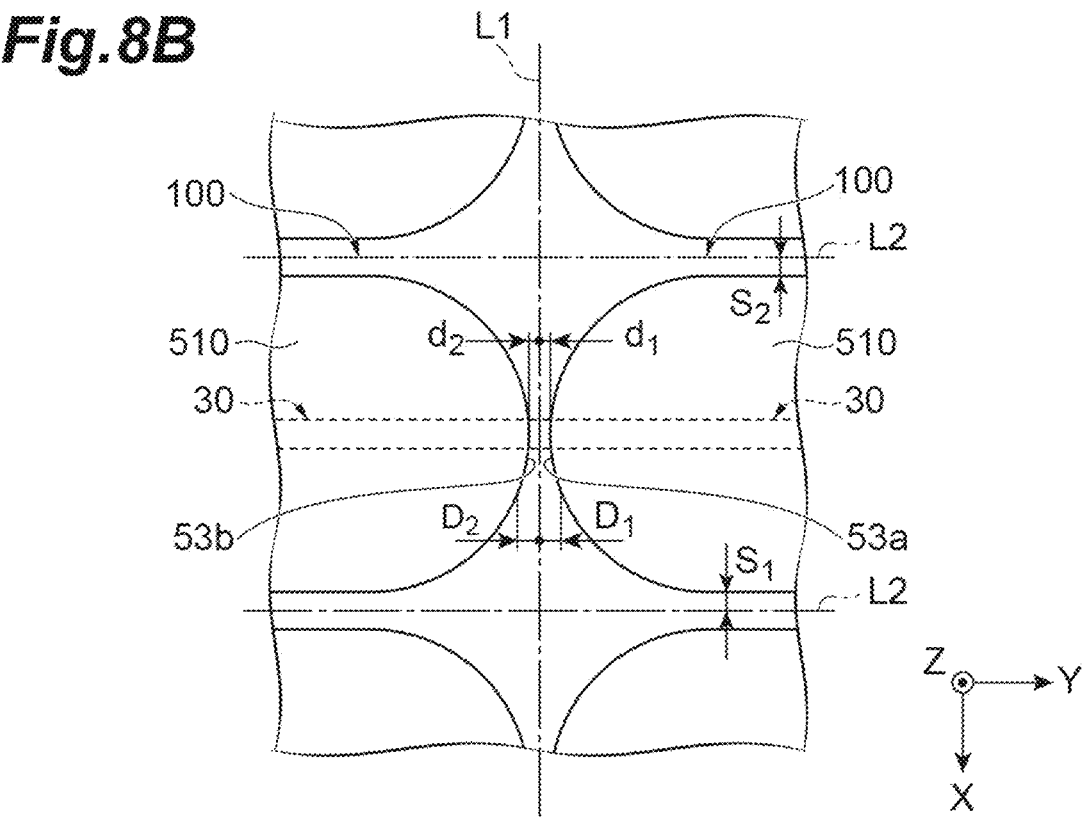

On the other hand, in an example shown in FIG. 8B, in each of a plurality of the element portions 100 that are integrated in a state where the element portions 100 are arranged in a matrix pattern, the first electrode portions 510 have an oval shape (in other words, a track shape) when viewed in the Z-axis direction. In this case, regarding a pair of the element portions 100 adjacent to each other with the first line L1 interposed therebetween, in one element portion 100, no corner exists in the range satisfying $D_1 \leq S_1$ and $D_1 \leq S_2$, and in the other element portion 100, no corner exists in the range satisfying $D_2 \leq S_1$ and $D_2 \leq S_2$.

Figure 9B:
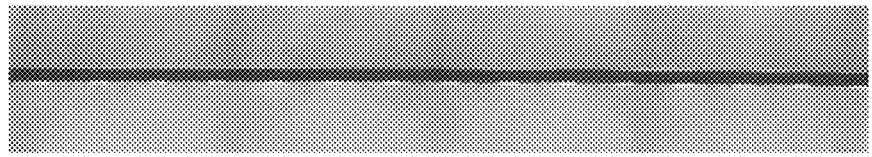

In this state, when the semiconductor wafer 200 and the semiconductor layer 300 are cleaved along each of the plurality of first lines L1 (primary cleavage), as shown in FIG. 9B, the above-described streaks are unlikely to appear on cleavage surfaces of a plurality of the element portions 100 that are integrated in a state where the element portions 100 are one-dimensionally arranged. A picture shown in FIG. 9B is a picture obtained when the width of the side surface 53 in the Z-axis direction (refer to FIG. 1) is approximately 9 µm and a minimum value of the street width (namely, $d_1+d_2$) is approximately 10 µm. In a state where the above-described streaks have not appeared, when the semiconductor wafer 200 and the semiconductor layer 300 are cleaved along each of the plurality of second lines L2 (secondary cleavage), in the obtained semiconductor laser element 1, a decrease in the quality of each of the first end surface 3a and the second end surface 3b is suppressed. Incidentally, when each of $d_1$ and $d_2$ is less than 5 µm (namely, when $d_1+d_2$ is less than 10 µm), the first electrode portions 510 adjacent to each other with the first line L1 interposed therebetween are connected to each other because of a manufacturing error, and a cleavage defect occurs, which is a concern. Therefore, it is preferable that each of $d_1$ and $d_2$ is 5 µm or more.

[Configuration of Semiconductor Laser Device]

Figure 10:
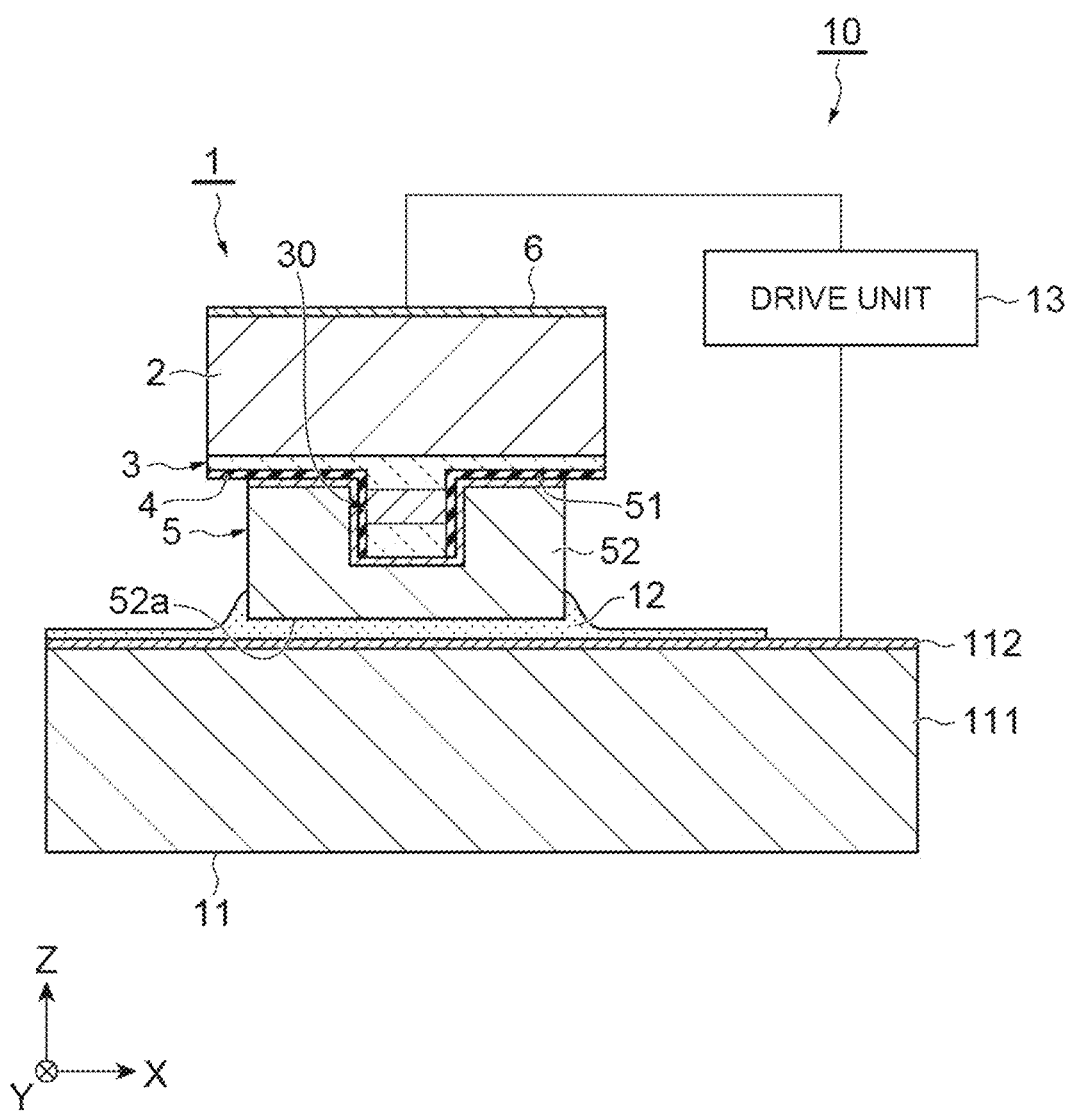
FIG. 10 is a cross-sectional view of a semiconductor laser device including the semiconductor laser element shown in FIG. 1.

As shown in FIG. 10, a semiconductor laser device 10 includes the semiconductor laser element 1 described above, a support portion 11, a joining member 12, and a drive unit 13. The support portion 11 includes a body portion 111 and an electrode pad 112. The support portion 11 is, for example, a sub-mount in which the body portion 111 is made of AlN. The support portion 11 supports the semiconductor laser element 1 in a state where the semiconductor laminate 3 is located on a support portion 11 side with respect to the semiconductor substrate 2 (namely, an epi-side-down state).

The joining member 12 joins the electrode pad 112 of the support portion 11 and the first electrode 5 of the semiconductor laser element 1 in the epi-side-down state. The joining member 12 is, for example, a solder member such as an AuSn member. A thickness of a portion of the joining member 12 disposed between the electrode pad 112 and the first electrode 5 is, for example, approximately several µm.

The drive unit 13 drives the semiconductor laser element 1 such that the semiconductor laser element 1 continuously oscillates laser light. The drive unit 13 is electrically connected to each of the electrode pad 112 of the support portion 11 and the second electrode 6 of the semiconductor laser element 1. In order to electrically connect the drive unit 13 to each of the electrode pad 112 and the second electrode 6, wire bonding is performed on each of the electrode pad 112 and the second electrode 6.

In the semiconductor laser device 10 configured as described above, a heat sink (not shown) is provided on the support portion 11 side. For this reason, in a configuration in which the semiconductor laser element 1 is mounted on the support portion 11 in the epi-side-down state, a heat dissipation characteristic of the semiconductor laminate 3 is easily secured. Therefore, when the semiconductor laser element 1 is driven to continuously oscillate laser light, an epi-side-down configuration is effective. Particularly, when the semiconductor laminate 3 is configured to oscillate laser light having a relatively short center wavelength (for example, a center wavelength of any value of 4 to 6 μm in a range of 4 to 11 μm) in the mid-infrared region and the semiconductor laser element 1 is driven to continuously oscillate the laser light, the epi-side-down configuration is effective. Incidentally, in the epi-side-down configuration, since the surface 52a of the metal plating layer 52 of the first electrode 5 is flattened, a support state of the semiconductor laser element 1 on the support portion 11 is stable.

Actions and Effects

In the semiconductor laser element 1, the shortest distance between the first side surface 21 of the semiconductor substrate 2 and the first region 53a of the first electrode 5 is smaller than each of the shortest distance between the third side surface 23 of the semiconductor substrate 2 and the third region 53c of the first electrode 5 and the shortest distance between the fourth side surface 24 of the semiconductor substrate 2 and the fourth region 53d of the first electrode 5. Accordingly, since the first region 53a of the first electrode 5 is close to the first end surface 3a, a good heat dissipation characteristic can be secured on the first end surface 3a. Further, when viewed in the Z-axis direction (thickness direction of the semiconductor substrate 2), the first region 53a is separated from the first end surface 3a in such a manner to extend away from the first end surface 3a in the Y-axis direction (length direction of the ridge portion 30) as the first region 53a extends away from the ridge portion 30 to both sides in the X-axis direction (width direction of the ridge portion 30). The first region 53a does not include a corner in the range satisfying $D_1 \leq S_1$ and $D_1 \leq S_2$ ($D_1$: the distance between the first end surface 3a and the first region 53a in the Y-axis direction, $S_1$: the shortest distance between the third side surface 23 and the third region 53c in the width direction of the ridge portion 30, and $S_2$: the shortest distance between the fourth side surface 24 and the fourth region 53d in the width direction of the ridge portion 30) when viewed in the Z-axis direction. Accordingly, even when the shortest distance between the first side surface 21 and the first region 53a is reduced such that a good heat dissipation characteristic can be secured on the first end surface 3a, a decrease in the quality of the first end surface 3a caused by a cleavage defect occurring during manufacturing of the semiconductor laser element 1 can be suppressed. Similarly, the shortest distance between the second side surface 22 of the semiconductor substrate 2 and the second region 53b of the first electrode 5 is smaller than each of the shortest distance between the third side surface 23 of the semiconductor substrate 2 and the third region 53c of the first electrode 5 and the shortest distance between the fourth side surface 24 of the semiconductor substrate 2 and the fourth region 53d of the first electrode 5. Accordingly, since the second region 53b of the first electrode 5 is close to the second end surface 3b, a good heat dissipation characteristic can be secured on the second end surface 3b. Further, when viewed in the Z-axis direction, the second region 53b is separated from the second end surface 3b in such a manner to extend away from the second end surface 3b in the Y-axis direction as the second region 53b extends away from the ridge portion 30 to both sides in the X-axis direction. The second region 53b does not include a corner in the range satisfying $D_2 \leq S_1$ and $D_2 \leq S_2$ ($D_2$: the distance between the second end surface 3b and the second region 53b in the Y-axis direction, $S_1$: the shortest distance between the third side surface 23 and the third region 53c in the width direction of the ridge portion 30, and $S_2$: the shortest distance between the fourth side surface 24 and the fourth region 53d in the width direction of the ridge portion 30) when viewed in the Z-axis direction. Accordingly, even when the shortest distance between the second side surface 22 and the second region 53b is reduced such that a good heat dissipation characteristic can be secured on the second end surface 3b, a decrease in the quality of the second end surface 3b caused by a cleavage defect occurring during manufacturing of the semiconductor laser element 1 can be suppressed. As described above, according to the semiconductor laser element 1, it is possible to secure a good heat dissipation characteristic on each of the first end surface 3a and the second end surface 3b while suppressing a decrease in the quality of each of the first end surface 3a and the second end surface 3b.

In the semiconductor laser element 1, when the width of the ridge portion 30 in the X-axis direction is w and the width of the first region 53a in the X-axis direction is $W_1$, the first region 53a does not include a corner in the range satisfying $W_1 \leq 10w$ when viewed in the Z-axis direction. Accordingly, in the ridge portion 30 and in the vicinity of the ridge portion 30, a decrease in the quality of the first end surface 3a can be reliably suppressed. Similarly, in the semiconductor laser element 1, when the width of the ridge portion 30 in the X-axis direction is w and the width of the second region 53b in the X-axis direction is $W_2$, the second region 53b does not include a corner in the range satisfying $W_2 \leq 10w$ when viewed in the Z-axis direction. Accordingly, in the ridge portion 30 and in the vicinity of the ridge portion 30, a decrease in the quality of the second end surface 3b can be reliably suppressed.

In the semiconductor laser element 1, the shortest distance between the first side surface 21 and the first region 53a in the Y-axis direction is 50 μm or less. Accordingly, a good heat dissipation characteristic can be reliably secured on the first end surface 3a. Similarly, in the semiconductor laser element 1, the shortest distance between the second side surface 22 and the second region 53b in the Y-axis direction is 50 μm or less. Accordingly, a good heat dissipation characteristic can be reliably secured on the second end surface 3b.

In the semiconductor laser element 1, the height of the ridge portion 30 in the Z-axis direction is 5 μm or more. Accordingly, since the thickness of the first electrode 5 is 5 μm or more, a good heat dissipation characteristic can be obtained, whereas the risk of a cleavage defect occurring during manufacturing of the semiconductor laser element 1 is high; however, with the above configuration, it is possible to secure a good heat dissipation characteristic on each of the first end surface 3a and the second end surface 3b while suppressing a decrease in the quality of each of the first end surface 3a and the second end surface 3b.

In the semiconductor laser element 1, the side surface 53 of the first electrode 5 is formed by the metal foundation layer 51 and the metal plating layer 52. Accordingly, the first electrode 5 having a thickness that can secure a good heat dissipation characteristic can be easily and reliably obtained. On the other hand, the risk of a cleavage defect occurring during manufacturing of the semiconductor laser element 1 is high; however, with the above configuration, it is possible to secure a good heat dissipation characteristic on each of the first end surface 3a and the second end surface 3b while suppressing a decrease in the quality of each of the first end surface 3a and the second end surface 3b.

In the semiconductor laser element 1, the active layer 31 has a quantum cascade structure. Accordingly, the quantum cascade laser element with high quality can be obtained.

According to the semiconductor laser device 10, in the semiconductor laser element 1, it is possible to secure a good heat dissipation characteristic on each of the first end surface 3a and the second end surface 3b while suppressing a decrease in the quality of each of the first end surface 3a and the second end surface 3b.

According to the method for manufacturing the semiconductor laser element 1, in the manufactured semiconductor laser element 1, it is possible to secure a good heat dissipation characteristic on each of the first end surface 3a and the second end surface 3b while suppressing a decrease in the quality of each of the first end surface 3a and the second end surface 3b.

Modification Examples

The present disclosure is not limited to the above-described embodiment. For example, a known quantum cascade structure can be applied to the active layer 31. Another known stack structure can be applied to the semiconductor laminate 3. As one example, in the semiconductor laminate 3, the upper guide layer may not have a diffraction grating structure functioning as a distributed feedback structure. In addition, the semiconductor laminate 3 may be configured as, for example, a laser diode. The present disclosure can also be applied to semiconductor laser elements other than the quantum cascade laser element.

When viewed in the Z-axis direction, the first region 53a may not include a corner in a range satisfying $W_1 \leq 5$ w and may not include a corner in a range satisfying $W_1 \leq w$. Similarly, when viewed in the Z-axis direction, the second region 53b may not include a corner in a range satisfying $W_2 \leq 5$ w and may not include a corner in a range satisfying $W_2 \leq w$.

When viewed in the Z-axis direction, the first region 53a may be separated from the first end surface 3a in such a manner to extend away from the first end surface 3a in the Y-axis direction as the first region 53a extends away from the ridge portion 30 to both sides in the X-axis direction, and may not include a corner at least in the range satisfying $D_1 \leq S_1$ and $D_1 \leq S_2$ when viewed in the Z-axis direction. Similarly, when viewed in the Z-axis direction, the second region 53b may be separated from the second end surface 3b in such a manner to extend away from the second end surface 3b in the Y-axis direction as the second region 53b extends away from the ridge portion 30 to both sides in the X-axis direction, and may not include a corner at least in the range satisfying $D_2 \leq S_1$ and $D_2 \leq S_2$ when viewed in the Z-axis direction. Incidentally, in the above-described embodiment, $S_1$ (shortest distance between the third side surface 23 and the third region 53c in the X-axis direction) and $S_2$ (shortest distance between the fourth side surface 24 and the fourth region 53d in the X-axis direction) are equal to each other, but $S_1$ and $S_2$ may be different from each other.

In the semiconductor laser element 1, as long as the first region 53a has a configuration in which "when viewed in the Z-axis direction, the first region 53a is separated from the first end surface 3a in such a manner to extend away from the first end surface 3a in the Y-axis direction as the first region 53a extends away from the ridge portion 30 to both sides in the X-axis direction, and does not include a corner at least in the range satisfying $D_1 \leq S_1$ and $D_1 \leq S_2$ when viewed in the Z-axis direction", the second region 53b may not have a configuration in which "when viewed in the Z-axis direction, the second region 53b is separated from the second end surface 3b in such a manner to extend away from the second end surface 3b in the Y-axis direction as the second end surface 3b extends away from the ridge portion 30 to both sides in the X-axis direction, and does not include a corner at least in the range satisfying $D_2 \leq S_1$ and $D_2 \leq S_2$ when viewed in the Z-axis direction". As long as the semiconductor laser element 1 is configured such that at least the first region 53a has the above configuration, even when the second region 53b includes corners, the corners do not face each other in proximity to each other before primary cleavage during manufacturing of the semiconductor laser element 1, so that the occurrence of a cleavage defect can be suppressed.

Figure 11:
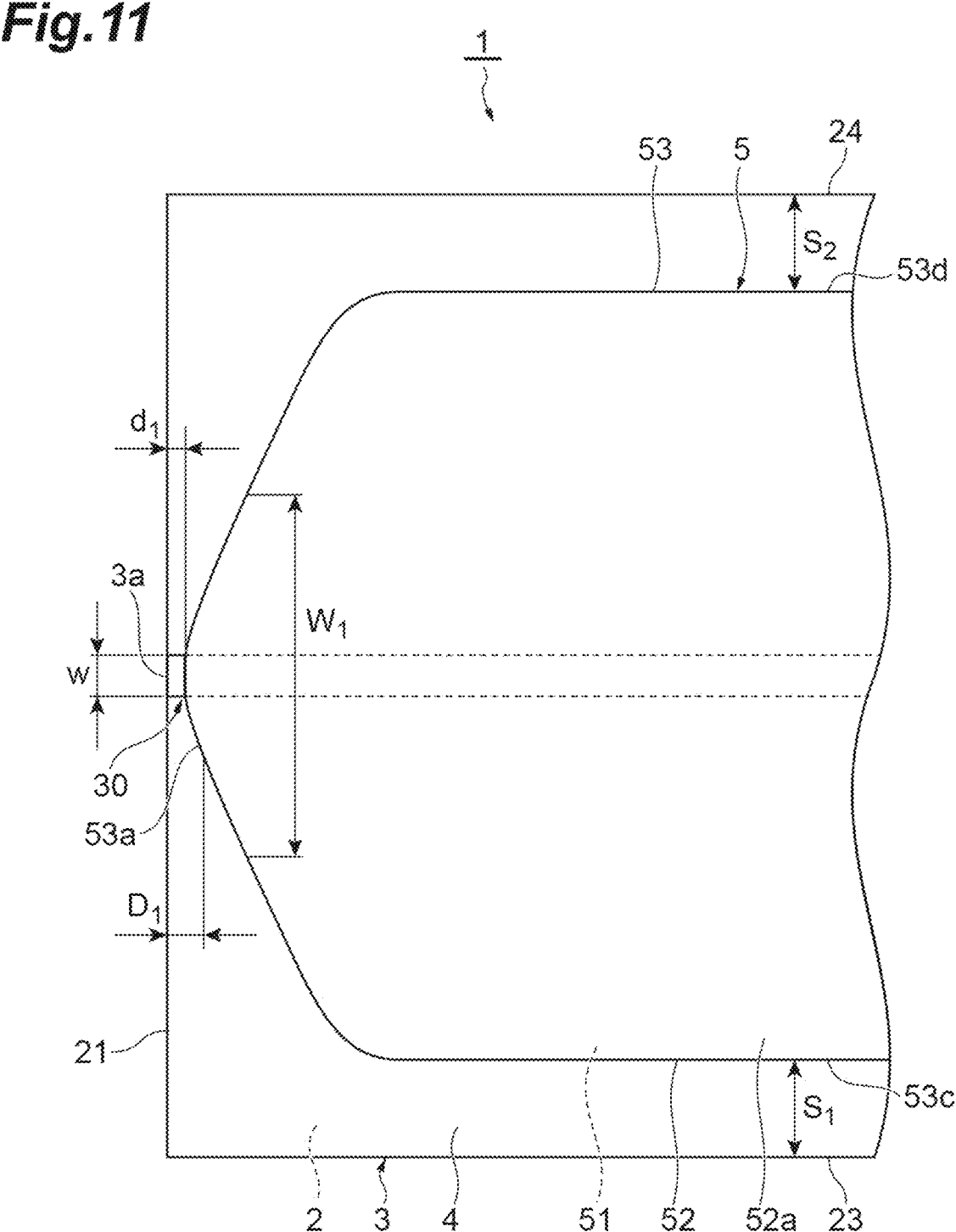
FIG. 11 is a partial plan view of a semiconductor laser element of a modification example.

As shown in FIG. 11, when viewed in the Z-axis direction, the first region 53a may extend linearly on both sides of the ridge portion 30 in the X-axis direction. Even in this case, the first region 53a does not include a corner in the range satisfying $D_1 \leq S_1$ and $D_1 \leq S_2$ when viewed in the Z-axis direction. Incidentally, in a modification example shown in FIG. 11, the first region 53a also does not include a corner in the range satisfying $W_1 \leq 10$ w when viewed in the Z-axis direction. The above fact also applies to the second region 53b.

Figure 12:
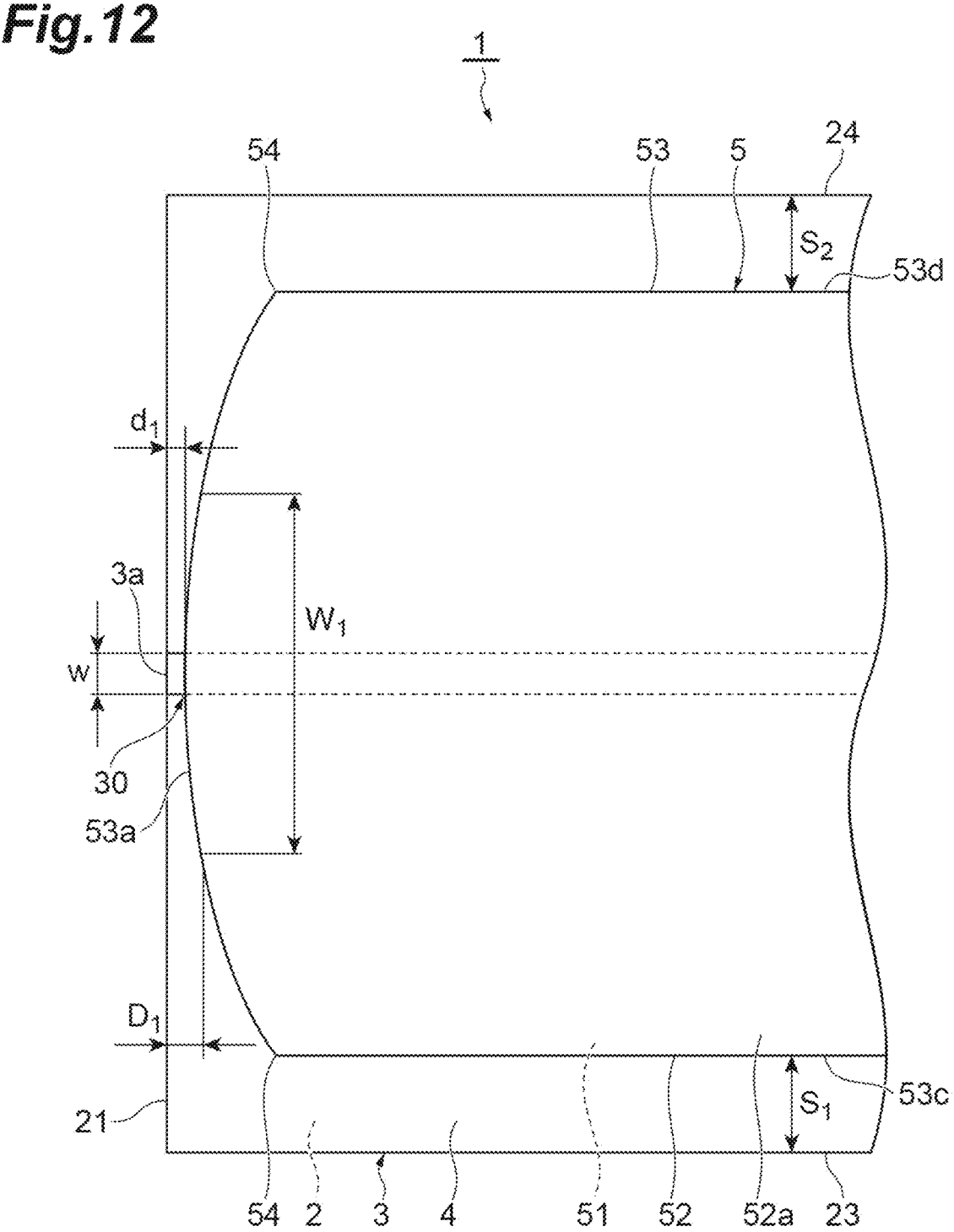
FIG. 12 is a partial plan view of a semiconductor laser element of a modification example.

As shown in FIG. 12, the first region 53a may include the corners 54 outside the range satisfying $D_1 \leq S_1$ and $D_1 \leq S_2$ when viewed in the Z-axis direction. Incidentally, in a modification example shown in FIG. 12, the corners 54 are located outside the range satisfying $W_1 \leq 10$ w when viewed in the Z-axis direction. The above fact also applies to the second region 53b.

Figure 13:
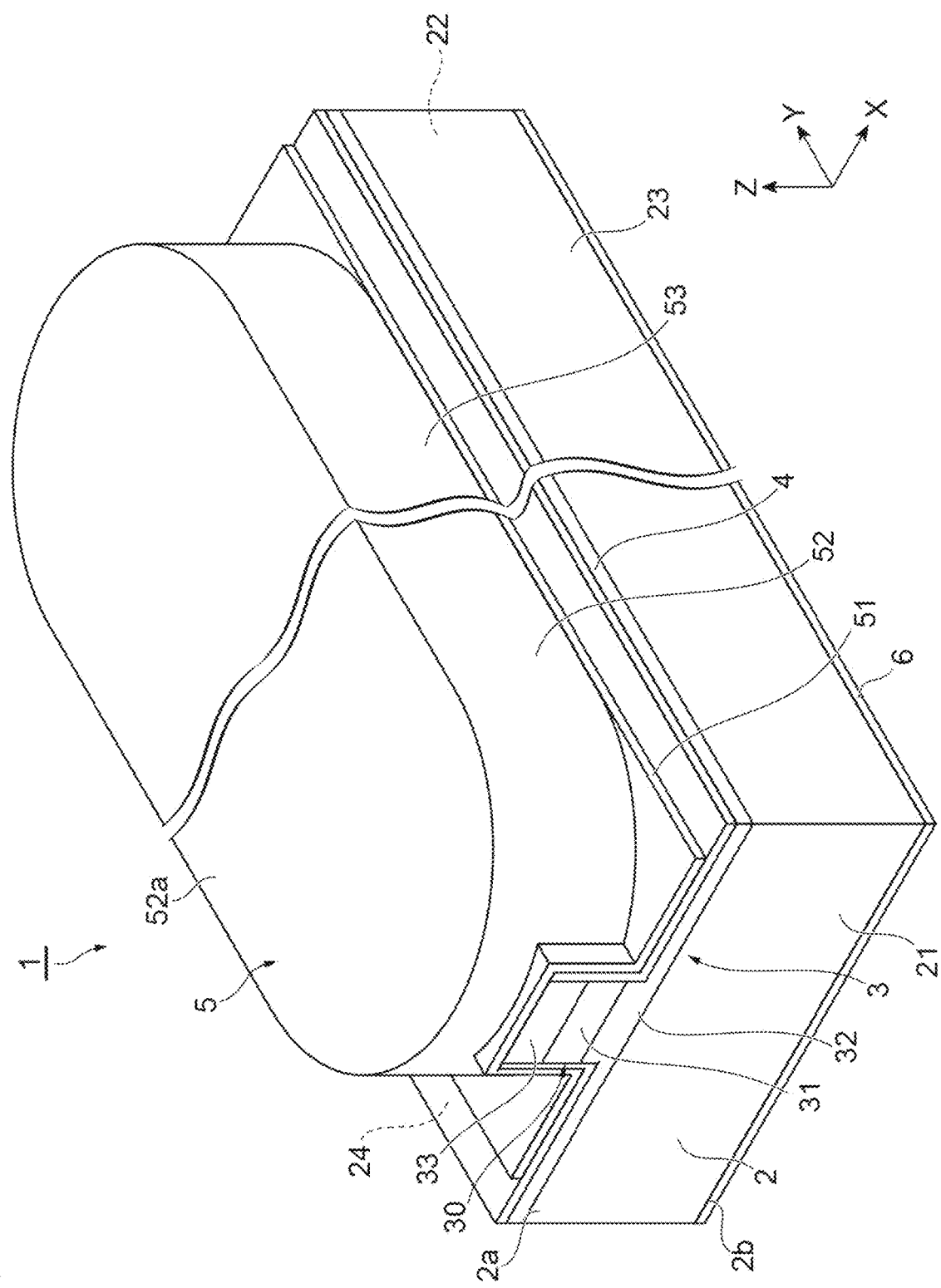
FIG. 13 is a perspective view of a semiconductor laser element of a modification example.

The side surface 53 of the first electrode 5 may be formed at least by the metal plating layer 52. When the side surface 53 is formed only by the metal plating layer 52, as shown in FIG. 13, when viewed in the Z-axis direction, an outer edge of the metal foundation layer 51 may coincide with the outer edges of the semiconductor substrate 2 and the semiconductor laminate 3. Namely, in the method for manufacturing the semiconductor laser element 1, a portion of the metal foundation layer 51 along the first line L1 may not be removed by etching. Even in that case, the semiconductor wafer 200 and the semiconductor layer 300 can be accurately cleaved. Incidentally, when the outer edge of the metal foundation layer 51 coincides with at least the first end surface 3a and the second end surface 3b when viewed in the Z-axis direction, a heat dissipation characteristic on the first end surface 3a and on the second end surface 3b can be secured.

The first electrode 5 is not limited to including the metal foundation layer 51 and the metal plating layer 52. The first electrode 5 may be formed of a plurality of stacked metal layers or may be formed of a single metal layer.

The drive unit 13 is not limited to driving the semiconductor laser element 1 such that the semiconductor laser element 1 continuously oscillates laser light, and may drive the semiconductor laser element 1 such that the semiconductor laser element 1 oscillates laser light in a pulsed manner. Namely, any driving method may be adopted as long as the drive unit 13 drives the semiconductor laser element 1.

The support portion 11 is not limited to supporting the semiconductor laser element 1 in the epi-side-down state and may support the semiconductor laser element 1 in a state where the semiconductor substrate 2 is located on the support portion 11 side with respect to the semiconductor laminate 3 (namely, in an epi-side-up state). Namely, any support method may be adopted as long as the support portion 11 supports the semiconductor laser element 1. Incidentally, in an epi-side-up configuration, since the surface 52a of the metal plating layer 52 of the first electrode 5 is flattened, when wire bonding is performed on the first electrode 5, the degree of freedom of the position of the wire bonding is limited.

The insulating film 4 may be formed such that at least a part of the surface 30a of the ridge portion 30 is exposed. Namely, in the method for manufacturing the semiconductor laser element 1, the insulating layer 400 may be formed such that at least a part of the surface 30a of the ridge portion 30 is exposed. However, in the semiconductor laser element 1, when the insulating film 4 is formed such that the entirety of the surface 30a of the ridge portion 30 is exposed, a contact area between the first electrode 5 and the ridge portion 30 is increased, so that a wide current injection region can be secured in the ridge portion 30, and a highly efficient light output characteristic can be obtained.

A semiconductor laser element according to one aspect of the present disclosure includes: a semiconductor substrate having a first major surface and a second major surface facing each other in a first direction, a first side surface and a second side surface facing each other in a second direction perpendicular to the first direction, and a third side surface and a fourth side surface facing each other in a third direction perpendicular to both the first direction and the second direction; a semiconductor laminate including a ridge portion forming a first end surface and a second end surface facing each other in the second direction, including an active layer, and formed on the first major surface; a first electrode formed on the semiconductor laminate in a state where the ridge portion is embedded in the first electrode; and a second electrode formed on the second major surface. A side surface of the first electrode includes a first region on the first side surface side, a second region on the second side surface side, a third region on the third side surface side, and a fourth region on the fourth side surface side. The first region is located inside the first side surface when viewed in the first direction, the second region is located inside the second side surface when viewed in the first direction, the third region is located inside the third side surface when viewed in the first direction, and the fourth region is located inside the fourth side surface when viewed in the first direction. When viewed in the first direction, the first region is separated from the first end surface in such a manner to extend away from the first end surface in the second direction as the first region extends away from the ridge portion to both sides in the third direction. A shortest distance between the first side surface and the first region in the second direction is smaller than each of a shortest distance between the third side surface and the third region in the third direction and a shortest distance between the fourth side surface and the fourth region in the third direction. When a distance between the first side surface and the first region in the second direction is $D_1$, the shortest distance between the third side surface and the third region in the third direction is $S_1$, and the shortest distance between the fourth side surface and the fourth region in the third direction is $S_2$, the first region does not include a corner in a range satisfying $D_1 \leq S_1$ and $D_1 \leq S_2$ when viewed in the first direction.

In the semiconductor laser element, the shortest distance between the first side surface of the semiconductor substrate and the first region of the first electrode is smaller than each of the shortest distance between the third side surface of the semiconductor substrate and the third region of the first electrode and the shortest distance between the fourth side surface of the semiconductor substrate and the fourth region of the first electrode. Accordingly, since the first region of the first electrode is close to the first end surface, a good heat dissipation characteristic can be secured on the first end surface. Further, when viewed in a thickness direction (first direction) of the semiconductor substrate, the first region is separated from the first end surface in such a manner to extend away from the first end surface in a length direction (second direction) of the ridge portion as the first region extends away from the ridge portion to both sides in a width direction (third direction) of the ridge portion. The first region does not include a corner in the range satisfying $D_1 \leq S_1$ and $D_1 \leq S_2$ ($D_1$: the distance between the first end surface and the first region in the length direction of the ridge portion, $S_1$: the shortest distance between the third side surface and the third region in the width direction of the ridge portion, and $S_2$: the shortest distance between the fourth side surface and the fourth region in the width direction of the ridge portion) when viewed in the thickness direction of the semiconductor substrate. Accordingly, even when the shortest distance between the first side surface and the first region is reduced such that a good heat dissipation characteristic can be secured on the first end surface, a decrease in the quality of the first end surface caused by a cleavage defect occurring during manufacturing of the semiconductor laser element can be suppressed. Therefore, according to the semiconductor laser element, it is possible to secure a good heat dissipation characteristic at least on the first end surface while suppressing a decrease in the quality of at least the first end surface.

In the semiconductor laser element according to one aspect of the present disclosure, when a width of the ridge portion in the third direction is w and a width of the first region in the third direction is $W_1$, the first region may not include a corner in a range satisfying $W_1 \leq 10 w$ when viewed in the first direction. Accordingly, in the ridge portion and in the vicinity of the ridge portion, a decrease in the quality of the first end surface can be reliably suppressed.

In the semiconductor laser element according to one aspect of the present disclosure, the shortest distance between the first side surface and the first region in the second direction may be 50 μm or less. Accordingly, a good heat dissipation characteristic can be reliably secured on the first end surface.

In the semiconductor laser element according to one aspect of the present disclosure, when viewed in the first direction, the second region may be separated from the second end surface in such a manner to extend away from the second end surface in the second direction as the second region extends away from the ridge portion to both sides in the third direction. A shortest distance between the second side surface and the second region in the second direction may be smaller than each of the shortest distance between the third side surface and the third region in the third direction and the shortest distance between the fourth side surface and the fourth region in the third direction. When a distance between the second side surface and the second region in the second direction is $D_2$, the shortest distance between the third side surface and the third region in the third direction is $S_1$, and the shortest distance between the fourth side surface and the fourth region in the third direction is $S_2$, the second region may not include a corner in a range satisfying $D_2 \leq S_1$ and $D_2 \leq S_2$ when viewed in the first direction. In the semiconductor laser element, the shortest distance between the second side surface of the semiconductor substrate and the second region of the first electrode is smaller than each of the shortest distance between the third side surface of the semiconductor substrate and the third region of the first electrode and the shortest distance between the fourth side surface of the semiconductor substrate and the fourth region of the first electrode. Accordingly, since the second region of the first electrode is close to the second end surface, a good heat dissipation characteristic can be secured on the second end surface. Further, when viewed in the thickness direction of the semiconductor substrate, the second region is separated from the second end surface in such a manner to extend away from the second end surface in the length direction of the ridge portion as the second region extends away from the ridge portion to both sides in the width direction of the ridge portion. The second region does not include a corner in the range satisfying $D_2 \leq S_1$ and $D_2 \leq S_2$ ($D_2$: the distance between the second end surface and the second region in the length direction of the ridge portion, $S_1$: the shortest distance between the third side surface and the third region in the width direction of the ridge portion, and $S_2$: the shortest distance between the fourth side surface and the fourth region in the width direction of the ridge portion) when viewed in the thickness direction of the semiconductor substrate. Accordingly, even when the shortest distance between the second side surface and the second region is reduced in the length direction of the ridge portion such that a good heat dissipation characteristic can be secured on the second end surface, a decrease in the quality of the second end surface caused by a cleavage defect occurring during manufacturing of the semiconductor laser element can be suppressed. Therefore, according to the semiconductor laser element, it is possible to secure a good heat dissipation characteristic at least on the second end surface while suppressing a decrease in the quality of at least the second end surface.

In the semiconductor laser element according to one aspect of the present disclosure, when a width of the ridge portion in the third direction is w and a width of the second region in the third direction is $W_2$, the second region may not include a corner in a range satisfying $W_2 \leq 10$ w when viewed in the first direction. Accordingly, in the ridge portion and in the vicinity of the ridge portion, a decrease in the quality of the second end surface can be reliably suppressed.

In the semiconductor laser element according to one aspect of the present disclosure, the shortest distance between the second side surface and the second region in the second direction may be 50 μm or less. Accordingly, a good heat dissipation characteristic can be reliably secured on the second end surface.

In the semiconductor laser element according to one aspect of the present disclosure, a height of the ridge portion in the first direction may be 5 μm or more. Accordingly, since the thickness of the first electrode is 5 μm or more, a good heat dissipation characteristic can be obtained, whereas the risk of a cleavage defect occurring during manufacturing of the semiconductor laser element is high; however, with the above configuration, it is possible to secure a good heat dissipation characteristic at least on the first end surface while suppressing a decrease in the quality of at least the first end surface.

In the semiconductor laser element according to one aspect of the present disclosure, the first electrode may include a metal foundation layer formed on the semiconductor laminate, and a metal plating layer formed on the metal foundation layer, and the side surface may be formed at least by the metal plating layer. Accordingly, the first electrode having a thickness that can secure a good heat dissipation characteristic can be easily and reliably obtained. On the other hand, the risk of a cleavage defect occurring during manufacturing of the semiconductor laser element is high; however, with the above configuration, it is possible to secure a good heat dissipation characteristic at least on the first end surface while suppressing a decrease in the quality of at least the first end surface.

In the semiconductor laser element according to one aspect of the present disclosure, the active layer may have a quantum cascade structure. Accordingly, the quantum cascade laser element with high quality can be obtained.

A semiconductor laser device according to one aspect of the present disclosure includes: the semiconductor laser element; and a drive unit configured to drive the semiconductor laser element.

According to the semiconductor laser device, in the semiconductor laser element, it is possible to secure a good heat dissipation characteristic at least on the first end surface while suppressing a decrease in the quality of at least the first end surface.

A method for manufacturing the semiconductor laser element according to one aspect of the present disclosure includes: a first step of preparing a semiconductor wafer including a plurality of substrate portions each of which becomes the semiconductor substrate, and of forming a semiconductor layer including a plurality of laminate portions each of which becomes the semiconductor laminate on one major surface of the semiconductor wafer; a second step of forming a first electrode layer including a plurality of first electrode portions each of which becomes the first electrode on the semiconductor layer; a third step of forming a second electrode layer including a plurality of second electrode portions each of which becomes the second electrode on the other major surface of the semiconductor wafer; and a fourth step of cleaving the semiconductor wafer and the semiconductor layer along each of a plurality of lines partitioning a plurality of element portions each of which becomes the semiconductor laser element off from each other. In the first step, the semiconductor layer is formed on the one major surface of the semiconductor wafer such that the plurality of laminate portions are arranged in a matrix pattern. In the second step, the first electrode layer is formed on the semiconductor layer such that the plurality of first electrode portions correspond to the plurality of laminate portions. In the third step, the second electrode layer is formed on the other major surface of the semiconductor wafer such that the plurality of second electrode portions correspond to the plurality of laminate portions. In the fourth step, the semiconductor wafer and the semiconductor layer are cleaved along each of a plurality of first lines extending in the third direction among the plurality of lines, and thereafter, the semiconductor wafer and the semiconductor layer are cleaved along each of a plurality of second lines extending in the second direction among the plurality of lines.

According to the method for manufacturing the semiconductor laser element, it is possible to secure a good heat dissipation characteristic at least on the first end surface while suppressing a decrease in the quality of at least the first end surface.

According to the present disclosure, it is possible to provide the semiconductor laser element, the semiconductor laser device, and the method for manufacturing the semiconductor laser element capable of securing a good heat dissipation characteristic at least on the first end surface while suppressing a decrease in the quality of at least the first end surface.

What is claimed is:

1. A semiconductor laser element comprising:
a semiconductor substrate having a first major surface and a second major surface facing each other in a first direction, a first side surface and a second side surface facing each other in a second direction perpendicular to the first direction, and a third side surface and a fourth side surface facing each other in a third direction perpendicular to both the first direction and the second direction;
a semiconductor laminate including a ridge portion forming a first end surface and a second end surface facing each other in the second direction, including an active layer having a quantum cascade structure, and formed on the first major surface;
a first electrode formed on the semiconductor laminate in a state where the ridge portion is embedded in the first electrode; and
a second electrode formed on the second major surface,
wherein a side surface of the first electrode includes a first region on the first side surface side, a second region on the second side surface side, a third region on the third side surface side, and a fourth region on the fourth side surface side,
the first region is located inside the first side surface when viewed in the first direction,
the second region is located inside the second side surface when viewed in the first direction,
the third region is located inside the third side surface when viewed in the first direction,
the fourth region is located inside the fourth side surface when viewed in the first direction,
when viewed in the first direction, the first region is separated from the first end surface in such a manner to extend away from the first end surface in the second direction as the first region extends away from the ridge portion to both sides in the third direction,
a shortest distance between the first side surface and the first region in the second direction is smaller than each of a shortest distance between the third side surface and the third region in the third direction and a shortest distance between the fourth side surface and the fourth region in the third direction, and
when a distance between the first side surface and the first region in the second direction is $D_1$, the shortest distance between the third side surface and the third region in the third direction is $S_1$, and the shortest distance between the fourth side surface and the fourth region in the third direction is $S_2$, the first region does not include a corner in a range satisfying $D_1 \leq S_1$ and $D_1 \leq S_2$ when viewed in the first direction.

2. The semiconductor laser element according to claim 1, wherein when a width of the ridge portion in the third direction is w and a width of the first region in the third direction is $W_1$, the first region does not include a corner in a range satisfying $W_1 \leq 10$ w when viewed in the first direction.

3. The semiconductor laser element according to claim 1, wherein the shortest distance between the first side surface and the first region in the second direction is 50 μm or less.

4. The semiconductor laser element according to claim 1, wherein when viewed in the first direction, the second region is separated from the second end surface in such a manner to extend away from the second end surface in the second direction as the second region extends away from the ridge portion to both sides in the third direction,
a shortest distance between the second side surface and the second region in the second direction is smaller than each of the shortest distance between the third side surface and the third region in the third direction and the shortest distance between the fourth side surface and the fourth region in the third direction, and
when a distance between the second side surface and the second region in the second direction is $D_2$, the shortest distance between the third side surface and the third region in the third direction is $S_1$, and the shortest distance between the fourth side surface and the fourth region in the third direction is $S_2$, the second region does not include a corner in a range satisfying $D_2 \leq S_1$ and $D_2 \leq S_2$ when viewed in the first direction.

5. The semiconductor laser element according to claim 4, wherein when a width of the ridge portion in the third direction is w and a width of the second region in the third direction is $W_2$, the second region does not include a corner in a range satisfying $W_2 \leq 10$ w when viewed in the first direction.

6. The semiconductor laser element according to claim 4, wherein the shortest distance between the second side surface and the second region in the second direction is 50 μm or less.

7. The semiconductor laser element according to claim 1, wherein a height of the ridge portion in the first direction is 5 μm or more.

8. The semiconductor laser element according to claim 1, wherein the first electrode includes a metal foundation layer formed on the semiconductor laminate, and a metal plating layer formed on the metal foundation layer, and
the side surface is formed at least by the metal plating layer.

9. A semiconductor laser device comprising:
the semiconductor laser element according to claim 1; and
a drive unit configured to drive the semiconductor laser element.

10. A method for manufacturing the semiconductor laser element according to claim 1, the method comprising:
a first step of preparing a semiconductor wafer including a plurality of substrate portions each of which becomes the semiconductor substrate, and of forming a semiconductor layer including a plurality of laminate portions each of which becomes the semiconductor laminate on one major surface of the semiconductor wafer;
a second step of forming a first electrode layer including a plurality of first electrode portions each of which becomes the first electrode on the semiconductor layer;
a third step of forming a second electrode layer including a plurality of second electrode portions each of which becomes the second electrode on the other major surface of the semiconductor wafer; and a fourth step of cleaving the semiconductor wafer and the semiconductor layer along each of a plurality of lines partitioning a plurality of element portions each of which becomes the semiconductor laser element off from each other, wherein in the first step, the semiconductor layer is formed on the one major surface of the semiconductor wafer such that the plurality of laminate portions are arranged in a matrix pattern, in the second step, the first electrode layer is formed on the semiconductor layer such that the plurality of first electrode portions correspond to the plurality of laminate portions, in the third step, the second electrode layer is formed on the other major surface of the semiconductor wafer such that the plurality of second electrode portions correspond to the plurality of laminate portions, and in the fourth step, the semiconductor wafer and the semiconductor layer are cleaved along each of a plurality of first lines extending in the third direction among the plurality of lines, and thereafter, the semiconductor wafer and the semiconductor layer are cleaved along each of a plurality of second lines extending in the second direction among the plurality of lines.

* * * * *